US012759846B1

(12) United States Patent
Bischoff et al.

(10) Patent No.: US 12,759,846 B1
(45) Date of Patent: Oct. 13, 2026

(54) PRECISION HIGH-CAPACITY SELF-SUPPORTING CRANE SYSTEM

(71) Applicant: CraneVeyor Corp., South El Monte, CA (US)

(72) Inventors: Gregory Bischoff, La Verne, CA (US); Timothy Angers, Long Beach, CA (US); Miguel Alberto Gonzalez, Chino, CA (US)

(73) Assignee: CraneVeyor Corp., South El Monte, CA (US)

( * ) Notice: Subject to any disclaimer, the term of this patent is extended or adjusted under 35 U.S.C. 154(b) by 0 days.

(21) Appl. No.: 19/654,183

(22) Filed: Apr. 21, 2026

Related U.S. Application Data

(60) Provisional application No. 63/947,918, filed on Dec. 23, 2025.

(51) Int. Cl.

| | |
|---|---|
| ***B66C 6/00*** | (2006.01) |
| ***B66C 7/04*** | (2006.01) |
| ***B66C 7/08*** | (2006.01) |
| ***B66C 17/00*** | (2006.01) |
| ***E04B 1/24*** | (2006.01) |
| *E04C 3/04* | (2006.01) |

(52) U.S. Cl.
CPC .................. *B66C 6/00* (2013.01); *B66C 7/04* (2013.01); *B66C 7/08* (2013.01); *B66C 17/00* (2013.01); *E04B 1/2403* (2013.01); *E04B 2001/2415* (2013.01); *E04C 2003/0465* (2013.01)

(58) Field of Classification Search
CPC .... B66C 6/00; B66C 7/04; B66C 7/08; B66C 17/00; E04B 1/2403; E04B 2001/2415; E04H 9/024; E04C 2003/0465
USPC .......................................... 104/125; 212/312
See application file for complete search history.

(56) References Cited

U.S. PATENT DOCUMENTS

| | | | | |
|---|---|---|---|---|
| 10,689,876 | B2 | 6/2020 | Richards | |
| 11,598,086 | B2 | 3/2023 | Onishi | |
| 2018/0347222 | A1 * | 12/2018 | Richards | E04H 9/021 |

FOREIGN PATENT DOCUMENTS

| | | | |
|---|---|---|---|
| CN | 2804039 Y | * | 8/2006 |
| CN | 1319843 C | * | 6/2007 |

(Continued)

*Primary Examiner* — Zachary L Kuhfuss
(74) *Attorney, Agent, or Firm* — DANE IP Law PC

(57) ABSTRACT

A precision, self-supporting crane system is disclosed that achieves high load capacity, seismic resilience, and rail-free operation through a torsional support architecture. The system includes columns interconnected by beams to form a network of moment-resisting frames, with runway beams supported by torsional corbel assemblies. Each torsional corbel assembly is a closed-section module that resists torsion, bending, and shear, maintaining precise alignment of the runway beams during operation, while providing resistance to seismic events. Flat, level beam seats define a fixed elevation for the runway beams, enabling straight, parallel alignment and allowing bridge end truck wheels to travel directly on the runway beams without ASCE rails. Alignment blocks and continuity bars connect adjacent runway beam segments to create continuous members. The result is a modular, lighter-weight crane system capable of supporting multi-ton loads on industry-standard concrete slabs typical in concrete tilt-up and industrial buildings without building tie-offs or diagonal bracing.

12 Claims, 29 Drawing Sheets

(56) References Cited

FOREIGN PATENT DOCUMENTS

| | | | |
|---|---|---|---|
| CN | 206438605 | U | 8/2017 |
| CN | 108439203 | B | 4/2021 |

* cited by examiner

PRECISION HIGH-CAPACITY SELF-SUPPORTING CRANE SYSTEM

CROSS REFERENCE TO RELATED APPLICATIONS

This nonprovisional application claims priority to provisional patent application Ser. No. 63/947,918, filed on 2025 Dec. 23, the entire contents of which are expressly incorporated herein by reference.

STATEMENT RE: FEDERALLY SPONSORED RESEARCH/DEVELOPMENT

Not Applicable.

BACKGROUND

The various aspects and embodiments described herein relate to a high-capacity crane system.

Conventional bridge crane systems commonly rely on building structures, diagonal bracing, or specialized crane rails to support operational and seismic loads. Such systems often require significant field welding, slab reinforcement, or permanent attachment to the building, which increases installation complexity, limits relocatability, and can introduce alignment challenges over long spans.

Accordingly, there is a need for a crane system that provides high load capacity, precise runway alignment, and seismic resistance while remaining self-supporting, modular, and installable on standard concrete slabs without reliance on building tie-offs or specialized rails.

BRIEF SUMMARY

The disclosed crane system is a precision, self-supporting bridge crane sized to support a ranges of multi-ton lifting capacities, including capacities between approximately 5 tons and 20 tons. The crane system includes a plurality of vertical columns arranged to support one or more runway beams and a bridge that travels along the runway beams to carry a hoist. The columns are rigidly interconnected by a grid of headers and runway beams to form a self-stabilizing, moment-resisting frame configured to resist operational and seismic loads without reliance on building walls, roofs, or diagonal bracing for support or stability.

The ends of each runway beam are supported on respective columns by torsional corbel assemblies fixed to the columns. A torsional corbel assembly includes a tubular corbel body projecting laterally from the column and a tubular runway beam seat attached to the corbel body such that the corbel body and runway beam seat cooperate to form a closed-section structural assembly. This closed-section geometry resists torsional loads, bending moments, and shear forces transmitted between the runway beam and the column, thereby restricting rotation of the column relative to the runway beam during crane operation and seismic excitation.

The runway beam seat defines a flat upper surface that establishes a fixed vertical elevation of the runway beam without shims, and supports square-cut end portions of adjacent runway beam segments in end-to-end alignment. Slotted holes in the runway beam and runway beam seat form a cross to permit alignment of the runway beams during installation. Adjacent runway beam segments are aligned using alignment block assemblies that facilitate runway beam alignment, after which continuity bars are attached to interconnect the segments so that the runway beams behave as continuous structural members.

Each column is supported on a concrete slab by a base assembly including a base plate, anchor bolts, and high-strength grout. The base assembly is configured without gussets or stiffeners to function as a structurally pinned connection that primarily transfers compressive and shear loads into the slab while limiting transfer of bending moments from the column to the slab. This load path allows the crane system to support high lifting capacities on standard reinforced and unreinforced concrete slabs as thin as four inches. Collectively, the torsional corbel assemblies, continuous runway beams, moment-resisting frames, and pinned base assemblies cooperate to provide a modular, rail-free, seismic-capable and building code-compliant crane system that is environmentally friendly from the standpoint of efficient use of materials through high strength-to-weight design, relocatability, and modifyability for revised uses.

—Alignment Blocks, Continuity, and Runway Beam Straightness (Crane System)—

A crane system is sized to support a lifting capacity between approximately 5 tons and approximately 20 tons. The crane system comprises a plurality of vertical columns. The vertical columns include a first set of columns arranged on a first side of the crane system. The vertical columns also include a second set of columns arranged on an opposite side of the crane system. The crane system further comprises a first set of two or more runway beams supported by the first set of columns. The crane system further comprises a second set of two or more runway beams supported by the second set of columns. The crane system further comprises an alignment block assembly. The alignment block assembly aligns adjacent runway beam segments of at least one of the first set of runway beams and the second set of runway beams in a transverse direction. The alignment block assembly thereby straightens the runway beams in a longitudinal direction. The alignment block assembly has a first alignment block. The first alignment block is fixed to a web of a first runway beam segment. The alignment block assembly also has a second alignment block. The second alignment block is fixed to a web of a second runway beam segment. The second runway beam segment is positioned adjacent to the first runway beam segment. The first and second alignment blocks have complementary mating features formed on the first and second alignment blocks. The complementary mating features are configured to engage one another. The alignment block assembly further has a fastener. The fastener is configured to draw the first alignment block toward the second alignment block. Engagement of the complementary mating features thereby aligns the first and second runway beam segments relative to one another in the transverse direction.

The complementary mating features comprise a protrusion formed on one of the first and second alignment blocks. The complementary mating features further comprise a notch formed on the other of the first and second alignment blocks.

A protrusion and a notch are oriented vertically. Engagement of the protrusion and notch constrains relative movement of the first and second runway beam segments in a lateral direction. Engagement of the protrusion and notch permits alignment in a vertical direction to be defined by a runway beam seat.

The lateral direction is perpendicular to a longitudinal travel direction of a bridge supported by the runway beams.

The fastener extends through a through-hole in the first alignment block. The fastener engages a threaded hole in the second alignment block.

Tightening of the fastener draws square-cut end portions of the first and second runway beam segments into end-to-end contact.

The alignment block assembly corrects misalignment of the first and second runway beam segments in the lateral direction.

The alignment block assembly is configured to align the first and second runway beam segments prior to attachment of continuity bars.

The alignment block assembly cooperates with a runway beam seat to produce a straight and parallel running surface for a bridge of the crane system.

The alignment block assembly aligns the first and second runway beam segments such that end truck wheels of a bridge are positioned directly above respective webs of the runway beam segments.

The complementary mating features comprise a tapered notch and a tapered protrusion. The tapered notch and the tapered protrusion are vertically oriented. The tapered notch and the tapered protrusion permit relative vertical movement between the first and second runway beam segments. The tapered notch and the tapered protrusion constrain alignment in the lateral direction.

The tapered notch and the tapered protrusion are V-configured. Tightening of the fastener causes the V-configured tapered notch and tapered protrusion to mate with one another. Mating of the V-configured tapered notch and tapered protrusion aligns the first and second runway beam segments in the transverse direction.

Two or more continuity bars are attached to opposed top flanges of the adjacent runway beam segments. Two or more continuity bars are attached to opposed bottom flanges of the adjacent runway beam segments.

The continuity bars are attached to the first and second runway beam segments using fusion-welded threaded studs. The fusion-welded threaded studs extend from top and bottom flanges of the runway beam segments. The fusion-welded threaded studs are positioned below a bottom surface of the top flange of the runway beam segments. The continuity bars and associated fasteners are thereby located outside a load path of bridge end-truck wheels traveling along the runway beams.

End portions of the first and second runway beam segments are cut at a substantially ninety-degree angle relative to a longitudinal axis of the runway beam segments.

Tightening of the fastener of the alignment block assembly draws the end portions of the first and second runway beam segments into direct contacting engagement with one another. Contact between the end portions cooperates with the alignment block assembly to maintain straightness of the adjacent runway beam segments.

—Column Base and Slab Interface (Crane System)—

A crane system is sized to support a lifting capacity between approximately 5 tons and approximately 20 tons. The crane system comprises a plurality of vertical columns. The crane system further comprises one or more runway beams supported by the plurality of vertical columns. The crane system further comprises a base assembly for each of the plurality of vertical columns. The base assembly supports the crane system on a concrete slab. Each base assembly comprises a base plate attached to a lower end of a respective vertical column. Each base assembly further comprises one or more anchor bolts extending from the concrete slab through the base plate. Each base assembly further comprises grout disposed between the base plate and the concrete slab. The base assembly forms a pinned connection to an underlying support surface.

The base plate is sufficiently thin such that torsional or bending moment loads applied to the vertical column are not substantially transferred into the concrete slab through the base plate.

The base plate is configured to function as a pinned connection to the underlying support surface. The base plate primarily transfers vertical compressive loads and shear loads into the concrete slab.

The grout is a non-shrink grout. The grout is configured to distribute vertical loads from the vertical column over a surface area of the concrete slab that is greater than a footprint of the base plate.

—Method of Building and Installing a Precision Crane System—

A method of building a precision crane system is provided. The crane system has a lifting capacity between approximately 5 tons and approximately 20 tons. The method comprises prefabricating a plurality of vertical columns prior to delivery to a job site where the crane system is to be installed. Each vertical column includes an angled plate at an upper end configured to connect to a header. Each vertical column further includes a torsional corbel assembly fixed to a tubular body of the vertical column. Each vertical column further includes a runway beam seat assembly fixed to the tubular body of the vertical column. Each vertical column further includes a base plate attached to a lower end of the tubular body of the vertical column. The method further comprises prefabricating one or more headers prior to delivery to the job site. Each header includes a mating angled plate configured to connect to the angled plate of a corresponding vertical column. The method further comprises cutting runway beams to a predetermined length such that end portions of the runway beams are cut at substantially ninety-degree angles. The cutting step is performed prior to delivery of the runway beams to the job site. The method further comprises mechanically straightening the runway beams to control camber, sweep, and twist. The straightening step is performed prior to delivery of the runway beams to the job site. The method further comprises predrilling connection holes in the vertical columns, the headers, the runway beams, and the runway beam seat assemblies prior to delivery to the job site. The method further comprises shipping to the job site the prefabricated vertical columns, the runway beams, the headers, a bridge, a hoist, stability brackets, fasteners including nuts, bolts, and washers, and grout. The method further comprises drilling anchor holes in a concrete slab and installing concrete anchors at predetermined locations. The method further comprises mounting the vertical columns onto the concrete anchors. The method further comprises adjusting a vertical height and plumb of each vertical column. The method further comprises attaching the headers to the angled plates of the vertical columns. The method further comprises mounting the runway beams onto the runway beam seat assemblies. The method further comprises placing the bridge onto the runway beams. The method further comprises mounting the hoist to the bridge. The method further comprises assembling the crane system at the job site primarily using bolted connections such that little to no welding is performed at the job site.

Substantially all welding associated with the vertical columns, the torsional corbel assemblies, the runway beam seat assemblies, and the headers is performed offsite prior to delivery to the job site.

The method further comprises installing the crane system on a concrete slab. The concrete slab has a nominal thickness of approximately four inches to six inches.

The method further comprises drilling holes in the concrete slab at predetermined locations corresponding to positions of the vertical columns. The method further comprises installing anchor bolts into the drilled holes.

The method further comprises mounting the vertical columns onto the anchor bolts. The method further comprises adjusting the vertical columns to be plumb. The method further comprises adjusting the beam seats to be at the same height. The method further comprises securing the base plates using nuts and washers.

The method further comprises placing grout between each base plate and the concrete slab. The grout distributes vertical loads from the vertical columns over the concrete slab.

The method further comprises attaching the headers to the angled plates of the vertical columns using bolted connections to form a moment-resisting frame.

The method further comprises placing the runway beams onto the runway beam seat assemblies. The method further comprises securing the runway beams to the runway beam seat assemblies using bolted connections.

The method further comprises aligning adjacent runway beam segments using an alignment block assembly prior to attaching continuity bars.

The method further comprises attaching continuity bars to the aligned adjacent runway beam segments with fusion welded studs. The runway beam segments thereby behave as a continuous structural member.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
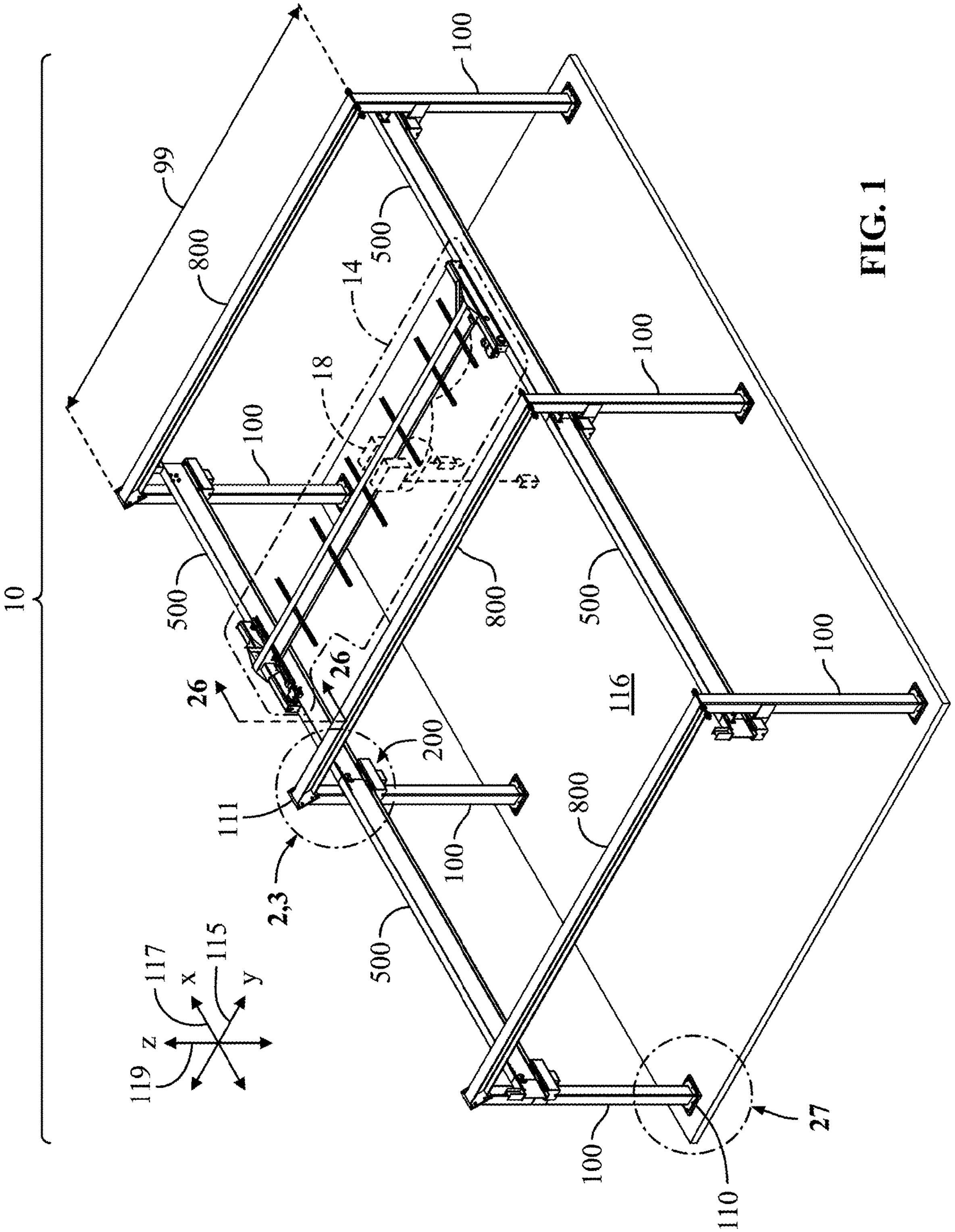
FIG. 1 is an isometric view of a self-supporting bridge crane system illustrating columns, runway beams, a bridge for supporting a hoist.

FIG. 1 illustrates the crane system 10 in an assembled and installed configuration, showing a self-supporting crane structure that is structurally independent of surrounding building walls or roofs. The system is designed to exceed the structural calculation requirements of all locally applicable domestic building codes. The crane system 10 includes multiple columns 100 supported on an existing concrete slab 116 and interconnected by headers 800 to form a rigid, moment-resisting frame. Each column 100 may comprise a vertical rectangular tube or, alternatively, a square steel tube of constant size for the full height of the column, configured to resist flexural loads in all horizontal directions. At the bottom of each column 100, there is an ungusseted and unenlarged base plate 110 (see FIGS. 1 and 27) with four holes, where mechanical anchorage such as wedge anchors are utilized to affix the structure to the slab. At the top, there is an angled plate 111 (see FIGS. 1-3) with holes configured to mate with another angled plate 113 attached to the headers 800. The crane system 10 further comprises a moving bridge 14 extending between the left and right runway beams 500. Unlike conventional bridge crane systems that rely on building structures for lateral and vertical support, the crane system 10 forms a freestanding structural system that carries all operational, gravity, and seismic loads internally through its own structural members. The structural efficiency of the moment-resisting frame enables the crane system 10 to be up to thirty percent lighter than conventional braced-frame crane support systems of similar capacity. The system's inherent ability to share and distribute forces also serves to reduce the concentration of stresses in various components that may otherwise lead to metal fatigue in more traditional setups.

Figure 4:
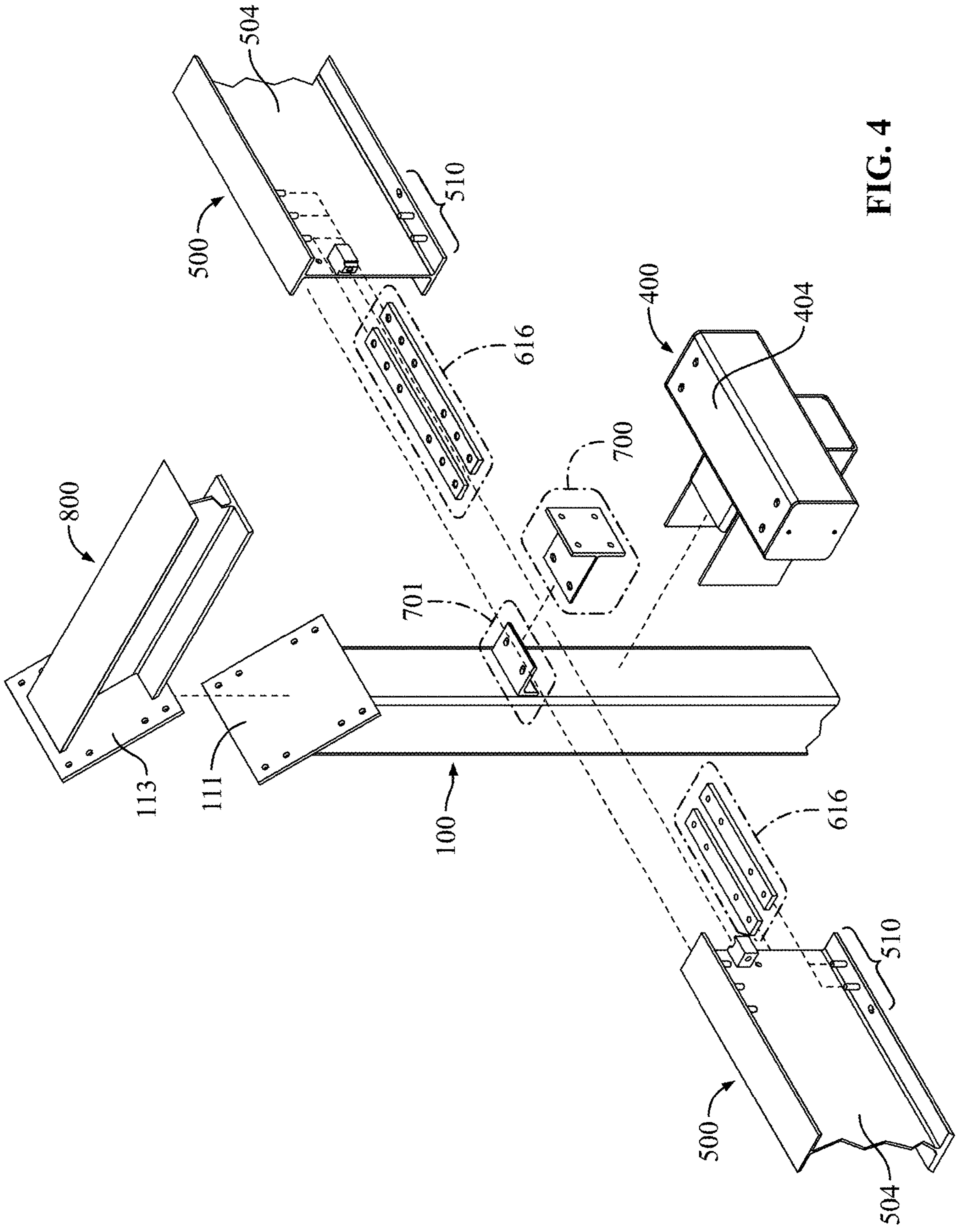
FIG. 4 is an exploded isometric view of the torsional corbel assembly and adjacent runway beams shown in FIG. 2.

Each header 800, as shown in FIG. 4, includes end portions cut at a forty-five-degree angle with an angled plate 113 that mate with corresponding angled plates 111 on the columns 100, allowing the headers 800 and columns 100 to cooperate to resist moment in the transverse y-direction 115 (see FIG. 1). The angled interface increases the effective weld and bolt length, improves load distribution, and reduces stress concentration at the header-to-column connection. This geometry enhances the seismic performance of the crane system 10 by improving resistance to rotation and lateral displacement in the y-direction 115.

Figure 8:
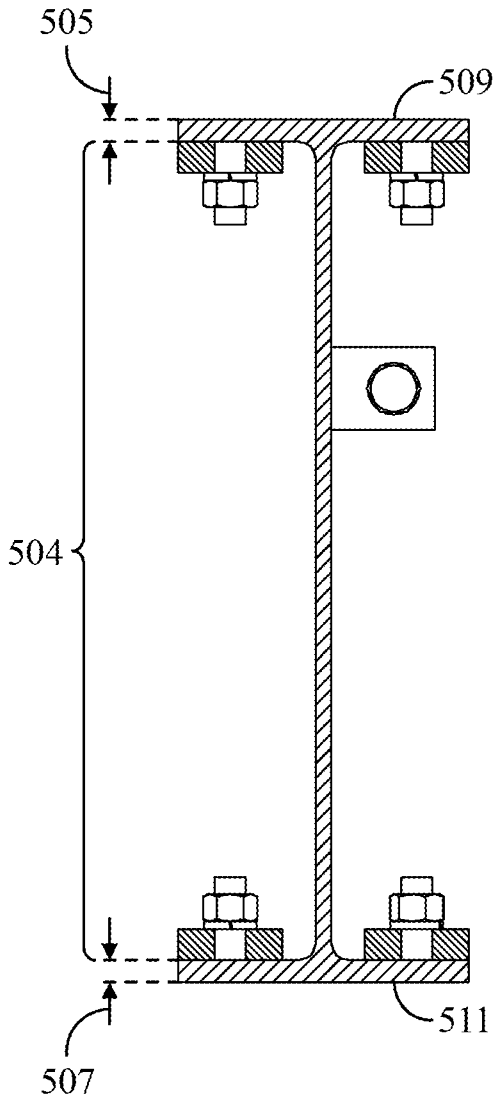
FIG. 8 is a cross-sectional view of a runway beam taken along line 8-8 of FIG. 7.
Figure 14:
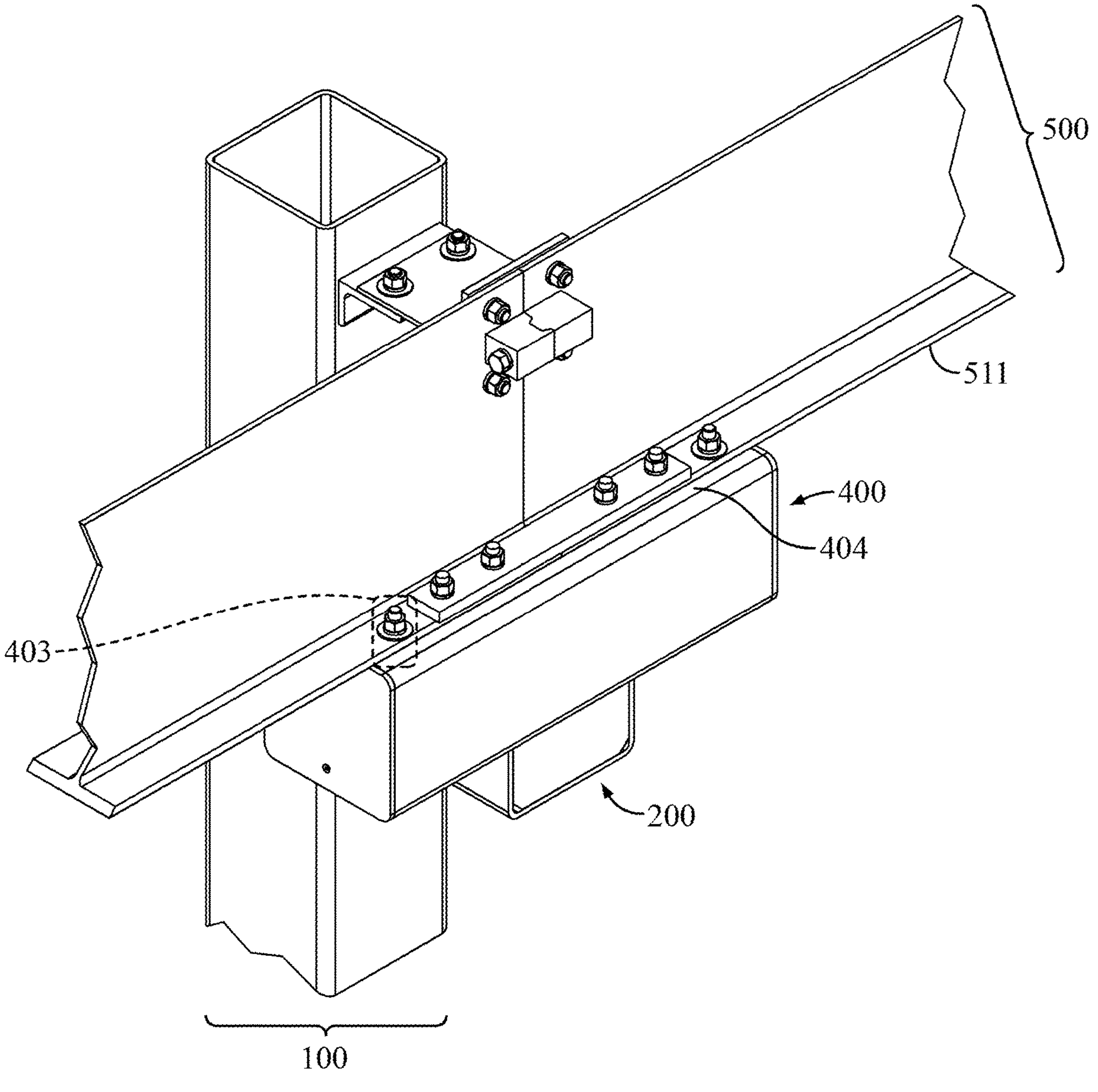
FIG. 14 is a cross-sectional isometric view taken along line 14-14 of FIG. 2.

The columns 100 support parallel runway beams 500 through torsional corbel assemblies 200 (see FIGS. 1, 2, 3 and 16) and runway beam seats 400 (see FIGS. 1, 2, 3 and 16). As shown in FIG. 8, the runway beams 500 are wide-flange (I-shaped) structural beams comprising a web 504, a top flange 505, and a bottom flange 507. The upper surface 509 of the top flange 505 is flat, and the bottom flange 507 is parallel to the top flange 505. The bottom surface 511 of the bottom flange 507 contacts and is supported by the upper surface 404 of the runway beam seat 400, as shown in FIGS. 8 and 14. The torsional corbel assemblies 200 act as rigid load-transfer interfaces between the runway beams 500 and the columns 100, resisting torsion, bending, and shear generated by crane operation and seismic forces. The runway beam seats 400 provide flat, level, and repeatable upper bearing surfaces 404 that are milled to a high flatness tolerance (e.g., within 0.05 inches) and define the vertical position of the runway beams 500.

The precision of the crane system 10 is evident in the alignment of the runway beams 500 in both the x-direction and γ-direction. The columns 100 are vertically adjusted, as discussed herein, at their base plates 110 to ensure the runway beam seats 400 are plumb to a vertical axis, lie in a common horizontal plane, allowing the runway beams 500 to be installed straight and parallel to each other and horizontal to the ground. This vertical adjustment is achieved through adjustable nut stacks on anchor bolts (see FIG. 27), allowing installers to fine-tune column height and plumbness of the columns before the system is locked in place. Because the runway beam seats 400 are manufactured and installed to tight tolerances, the resulting runway beam elevation is precise across the length of the crane system 10.

Figure 25:
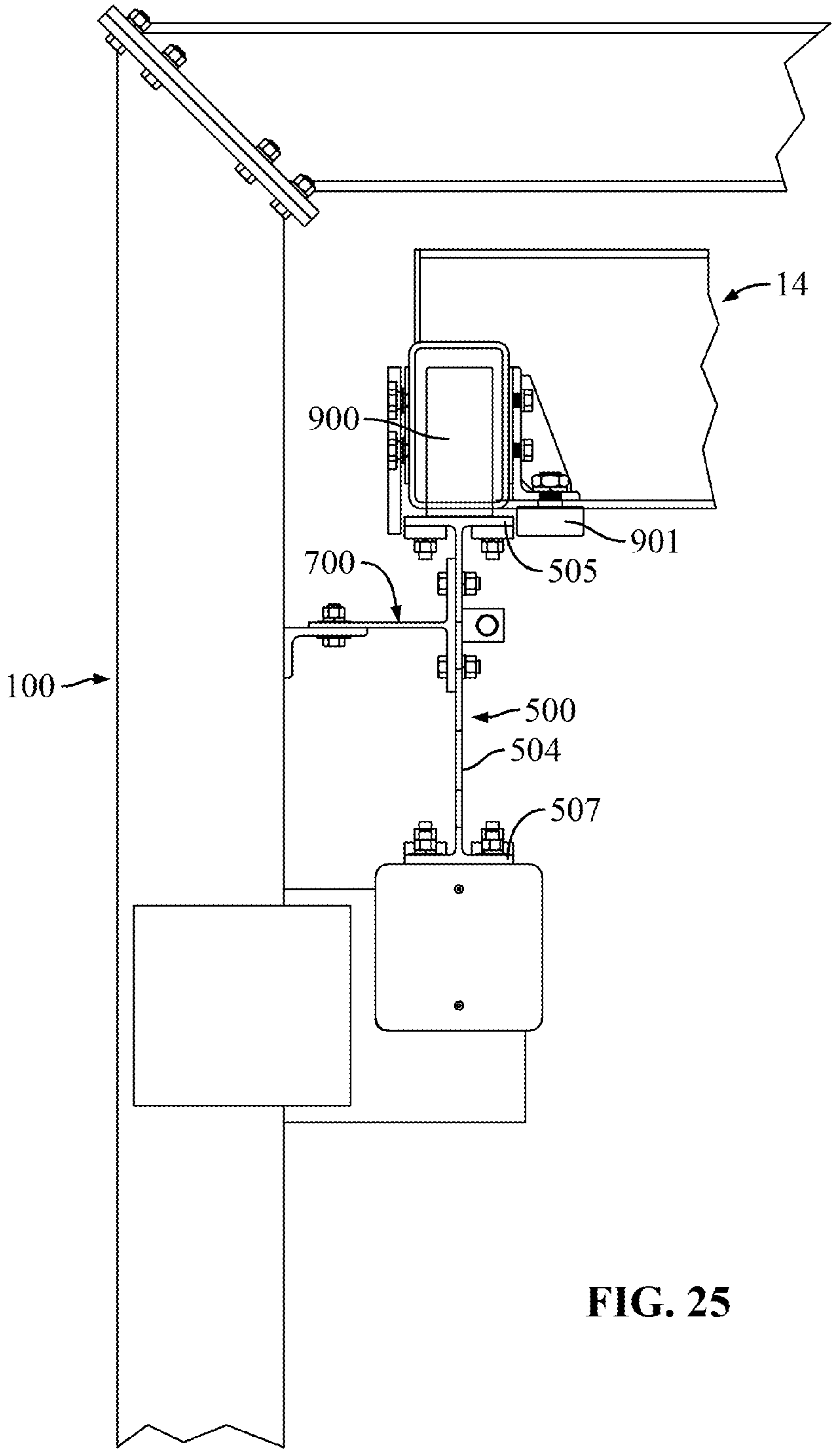
FIG. 25 is a cross-sectional side elevation view after the third step illustrating precise vertical alignment of a wheel of a bridge over a web of the runway beams and connection of the stability bracket between the columns and the runway beams.

This precision enables end truck wheels 900 to run directly on the runway beams 500, allowing operation without the need for ASCE crane rails while maintaining smooth and reliable bridge travel. Referring now to FIG. 25, a first end truck wheels 900 is located at a distal end portion of the bridge 14, and a second end truck wheel 900 is located at an opposed distal end portion of the bridge 14. Guide wheels 901 (FIG. 25) which run beside the runway beams 500 are attached to the corners of the end trucks for guidance of the bridge. A midpoint of the each end truck wheels 900 is positioned directly above the web 504 of its respective runway beam 500. The runway beams 500 are sufficiently straight such that the crane system 10 does not require separate bridge rails (e.g., ASCE rails) typically attached to the top of runway beams, although ASCE rails remain optional. The bridge 14 (see FIG. 1) traverses along the entire length of the connected runway beams 500 in the longitudinal x-direction 117. The crane system 10 further includes a hoist 18 that traverses along a length of the bridge 14 in the transverse y-direction. Alternatively, the hoist 18 may be fixed directly to the bridge 14 without a trolley. The hoist 18 includes a hook configured to lift a load in the vertical z-direction 119. The bridge end truck wheels 900 are positioned directly above the webs of the runway beams 500, allowing vertical loads from the bridge 14, hoist 18, and lifted loads to transfer directly in a balanced manner onto the runway beams 500 while minimizing bending of the flanges 505, 507.

Figure 26:
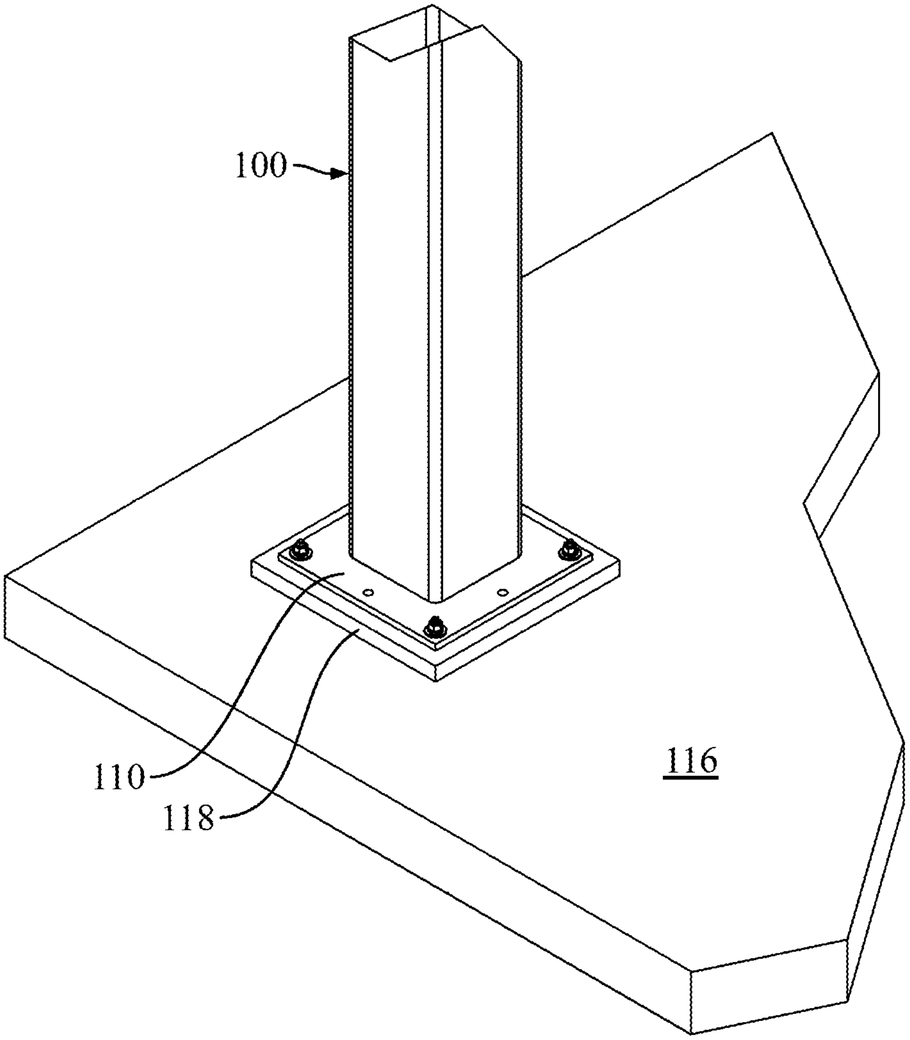
FIG. 26 illustrates completion of a fourth step of pouring a high-strength grout base between a base plate of the column and the concrete slab.
Figure 27:
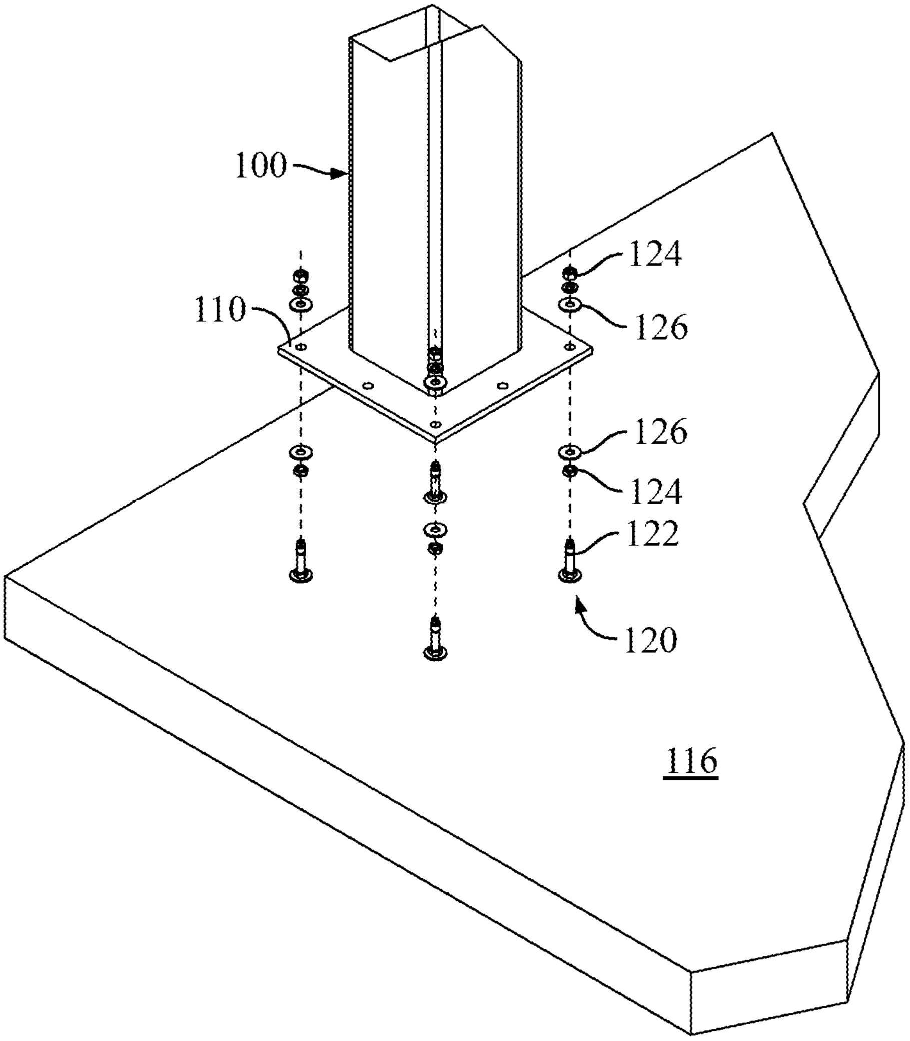
FIG. 27 is an exploded isometric view of a base plate of the column, anchors, and concrete slab.

FIG. 1 further illustrates the ability of the crane system 10 to handle multi-ton loads such as loads rated from 5, 10, 15, or up to 20 tons using a conventional reinforced or unreinforced concrete slab as thin as four inches 116. As shown in FIGS. 26 and 27, the base plates 110, post-installed anchors 120, anchor bolts 122, nuts 124, washers 126, and grout 118 support vertical and lateral loads while limiting moment transfer into the concrete slab 116. The unmodified concrete slab 116, typically found in concrete tilt-up buildings and industrial buildings, functions as the foundation for the crane and is sufficient to bear the maximum loaded capacity of the crane. Rather than relying on the slab to resist crane-induced moments, the system intentionally shifts moment resistance into the tops of the columns 100, the headers 800, the torsional corbel assemblies 200, and the runway beams 500. This design allows the crane system 10 to achieve high load ratings without requiring slab reinforcement beyond the existing six-inch thickness typical of industrial tilt-up concrete buildings and industrial buildings. This load path isolates the slab primarily to concentric flexural and shear forces while avoiding excessive bending moments associated with a rigidly fixed base at the slab interface.

The crane system 10 shown in FIG. 1 is also configured to withstand seismic events. In the longitudinal x-direction, the bridge 14 is supported on the runway beams 500 by bridge end truck wheels 900, allowing relative movement that reduces longitudinal seismic force transfer. This rolling interface allows the bridge 14 to move relative to the runway beams 500 during seismic excitation, preventing force accumulation within the bridge structure.

In the transverse direction, the headers 800 and columns 100 form moment-resisting connections that stabilize the crane system 10 during earthquake loading. The angled header-to-column connections cooperate with the column stiffness to resist seismic activity. In the longitudinal direction, seismic forces are transmitted through the torsional corbel assemblies 200 and distributed into the runway beams 500 and columns 100 rather than being concentrated at the slab interface.

Figure 7:
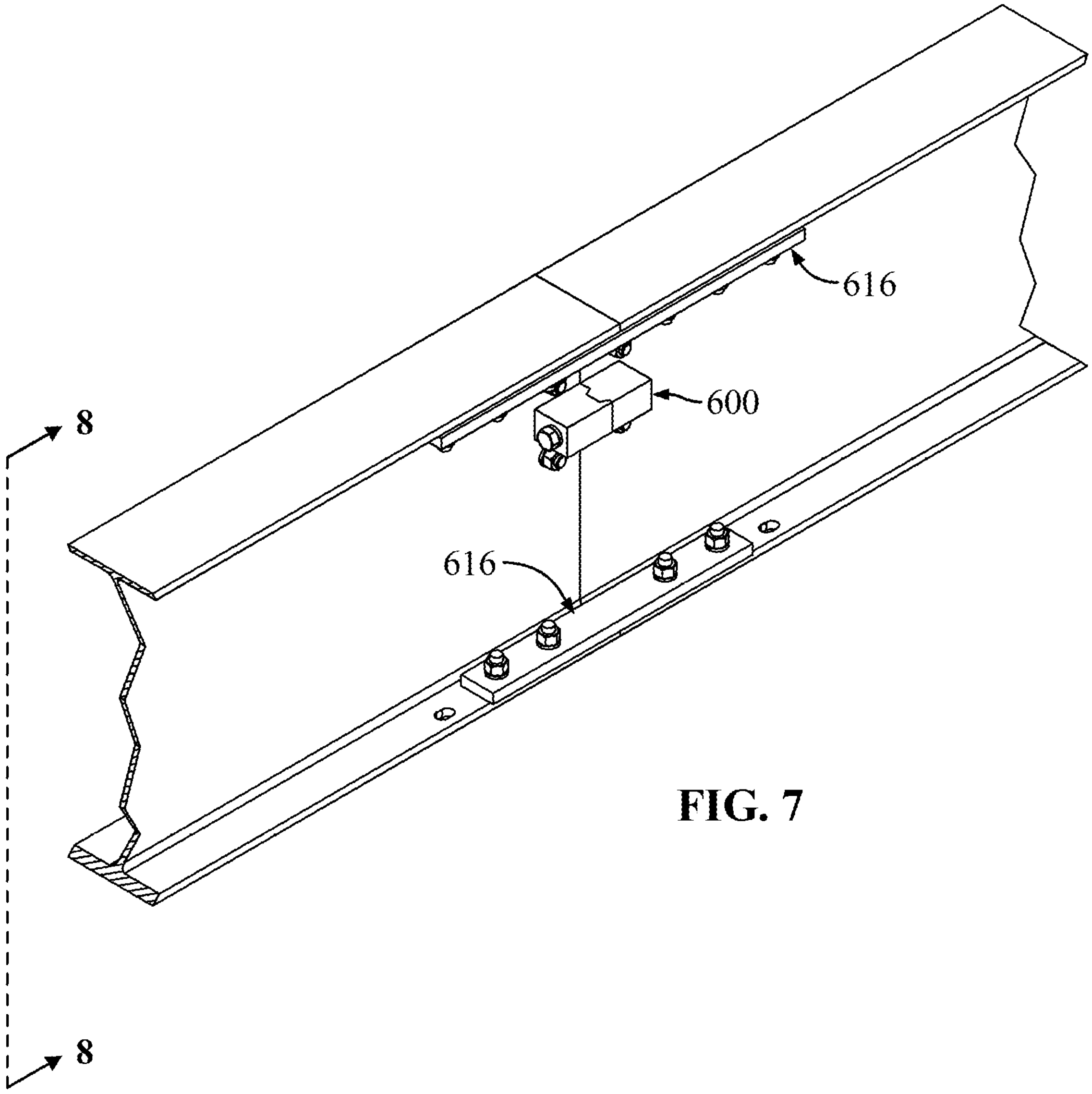
FIG. 7 is an isometric view of a runway beam including an alignment block assembly mounted to a web of adjacent runway beams.
Figure 11:
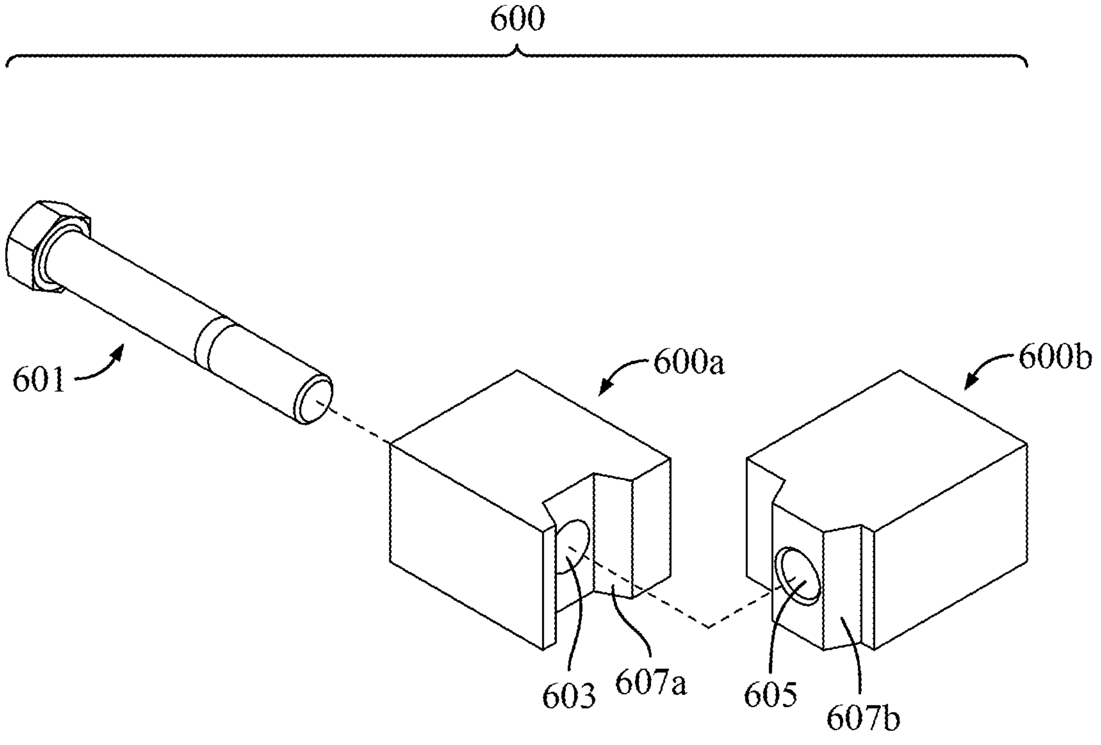
FIG. 11 is an exploded isometric view of the alignment block assembly.

FIG. 1 additionally demonstrates the modular and expandable nature of the crane system 10. The runway beams 500 are formed from connectable beam sections that may be extended lengthwise using alignment blocks 600 (see FIGS. 7 and 11) and continuity bars 616 (see FIGS. 4 and 7). The precision end-cuts of the beams are executed to be 8× more precise than traditional structural beam cut tolerances which are permitted by AISC Code of Standard Practice to be up to 0.7-degrees and the traditional gap between adjacent runway beam 500 segments has been eliminated. This precise fitment permits the flanges of adjacent segments 510 to transmit compressive stress directly from one beam to another without relying on additional connecting parts. These fabrication techniques and components allow adjacent runway beam sections to be precisely aligned and structurally connected to each other so that the runway beam segments 500 behave as unitary, continuous members for their full lengths.

The spacing 99, 101 between columns 100 and the length of the headers 800 may be adjusted to increase the width of the crane system 10, and a longer bridge 14 may be installed as needed. By increasing column spacing and header length, the effective crane span can be widened to an effective width of up to 30 feet without altering the fundamental structural concept. Additional columns, runway beams and headers may be added in the x-direction to increase an overall length of up to 60 feet.

Finally, FIG. 1 shows that the crane system 10 achieves structural stability without X-bracing or supplementary rigid beams between adjacent columns 100. The torsional corbel assemblies 200 function to resist loads in the x-direction so that the crane system 10 is stable in the x-direction due to x-direction forces. This open-frame configuration improves usability and safety while maintaining seismic and operational stability. The absence of building tie-offs, field welding, and specialized fasteners further illustrates a crane system 10 that is precise, seismic-capable, expandable, relocatable, and capable of supporting heavy loads using standard construction conditions. All fabricated structural components of the crane system 10 are secured on site using only bolted connections with no field welding, preferably utilizing standard Grade 5 bolts, and do not require the use of structural high-strength bolts, twist-off bolts, or specialized tension control hardware for installation. Nevertheless, it is still contemplated that the crane system 10 may utilize these devices.

Figure 2:
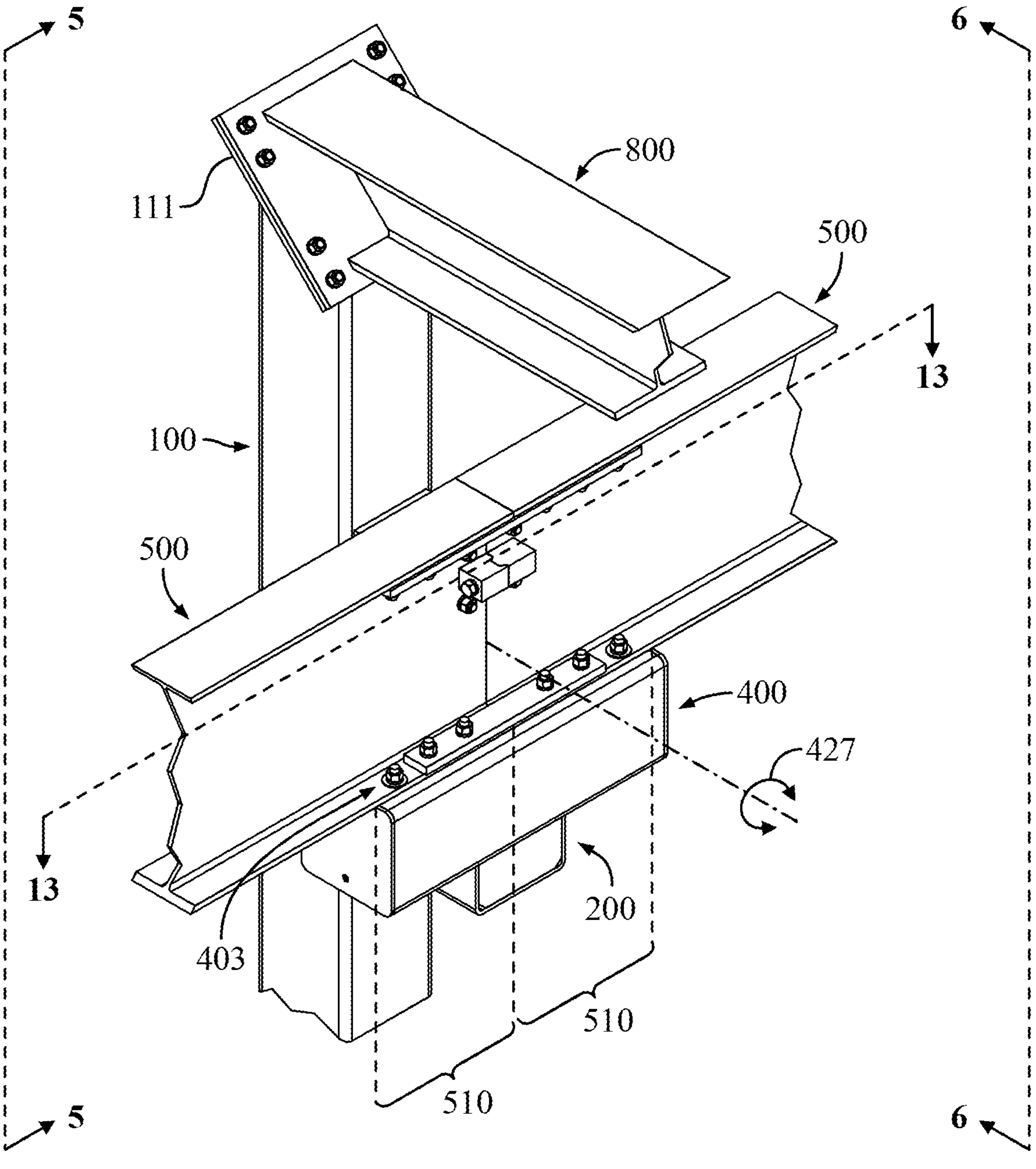
FIG. 2 is a front isometric view of a torsional corbel assembly supporting adjacent runway beam segments with the torsional corbel assembly mounted to a column.

FIG. 2 illustrates a torsional corbel assembly 200 mounted to a column 100 and supporting end sections 510 of adjacent runway beams 500 in an end-to-end arrangement. The column 100 is interconnected at an upper portion with a header 800, which cooperates with the column 100 to form part of the moment-resisting frame of the crane system 10 in the y-direction. Each runway beam 500 is supported at its end portion 510 on a corresponding runway beam seat 400 that is fixed to the torsional corbel assembly 200.

Figure 3:
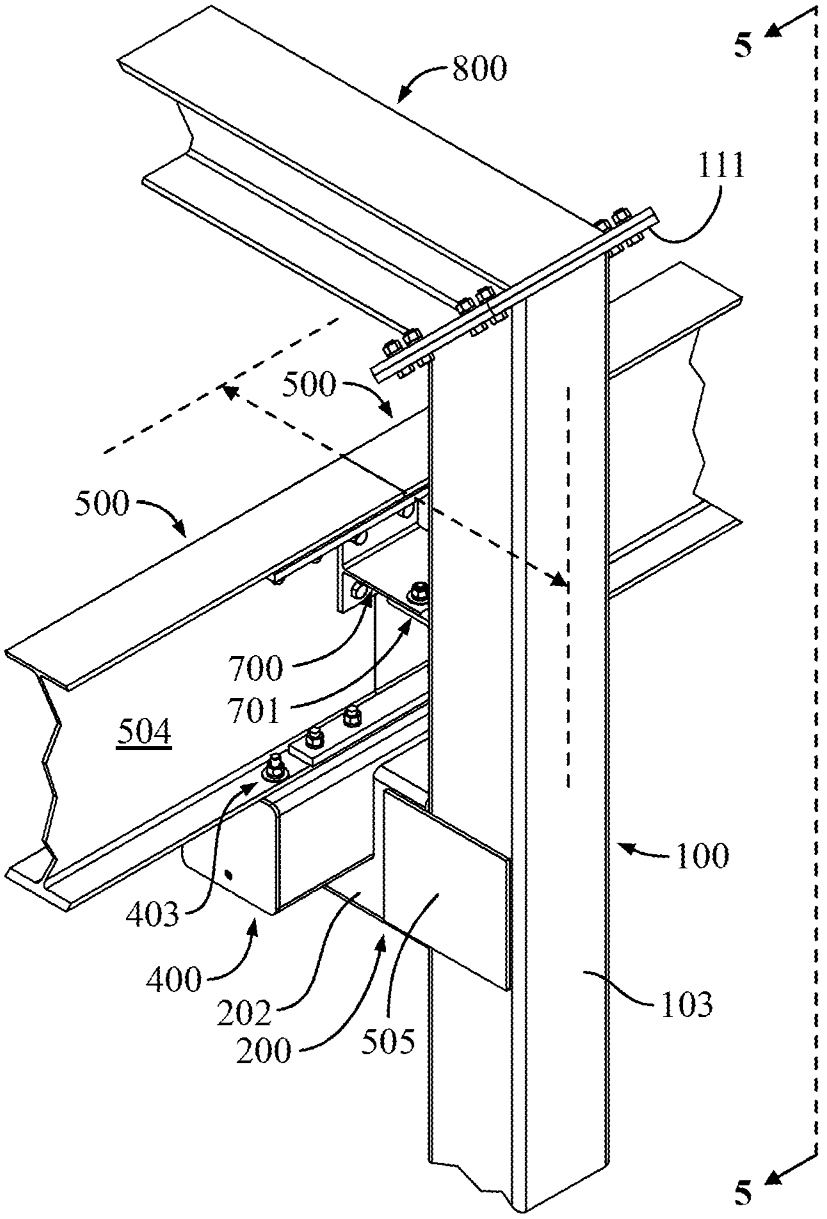
FIG. 3 is a rear isometric view of the torsional corbel assembly of FIG. 2 which is mounted to the column and supporting the adjacent runway beam.
Figure 20:
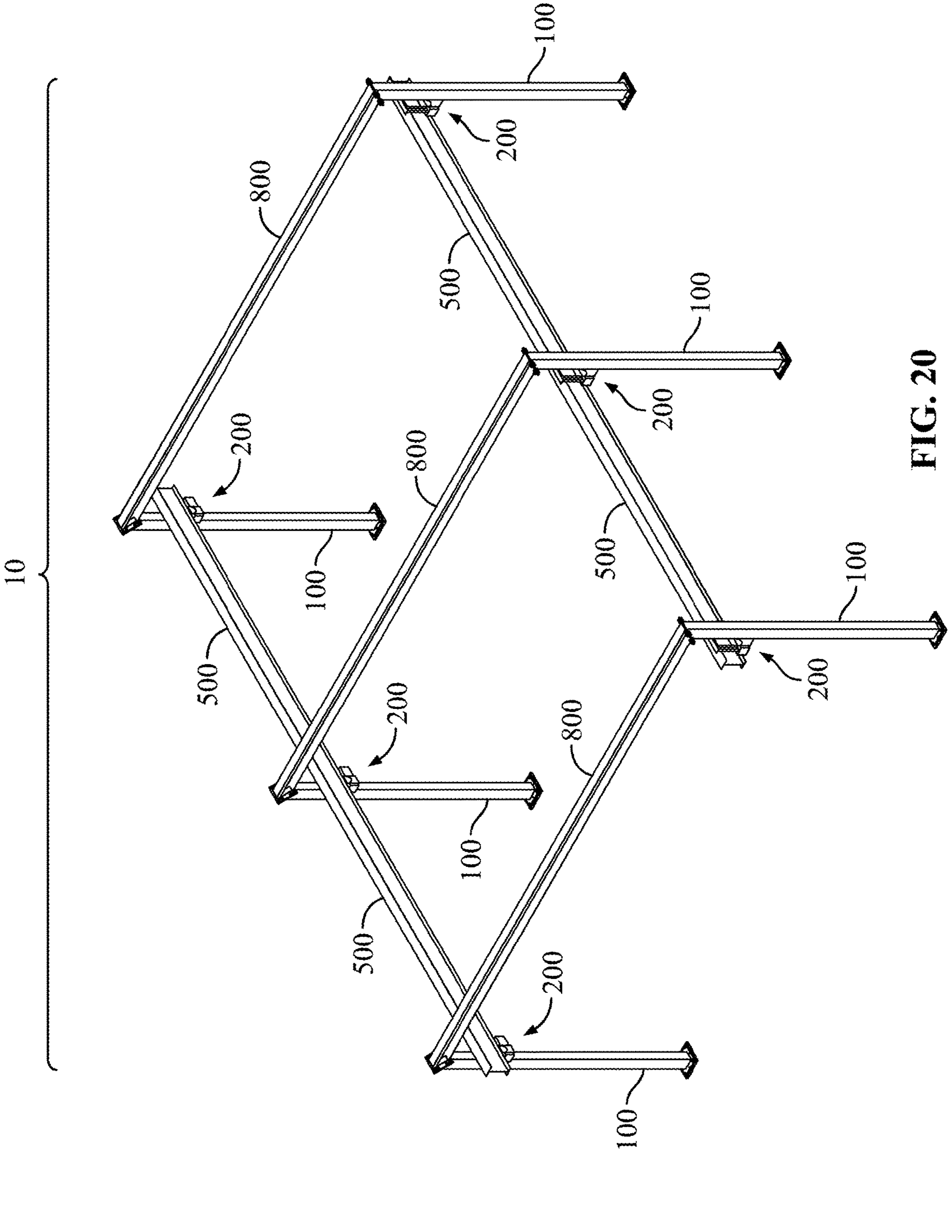
FIG. 20 is an isometric view of the crane system before a seismic event.
Figure 21:
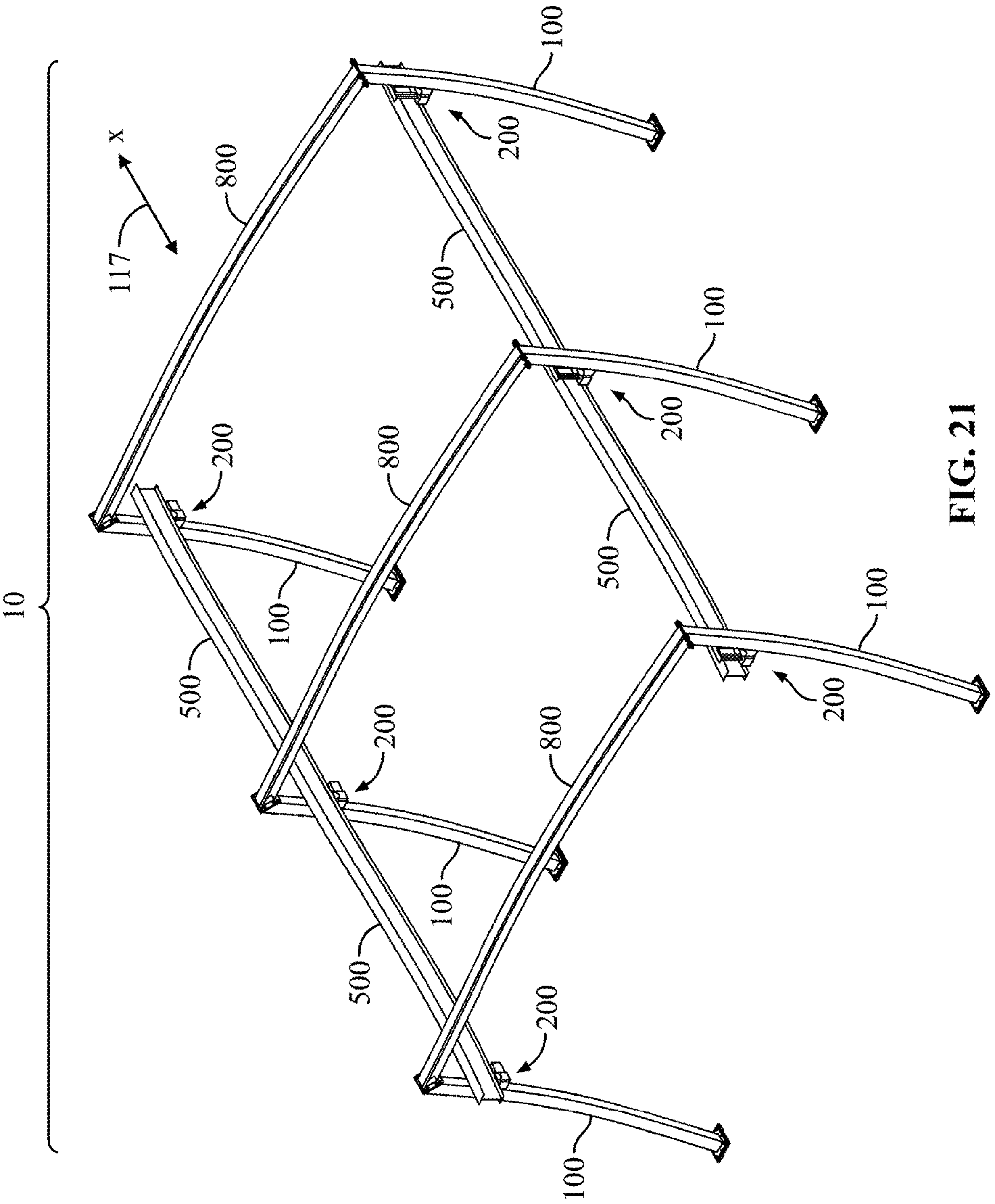
FIG. 21 is an isometric view of the crane system during a longitudinal seismic event, illustrating the structure's reaction to forces transmitting from the ground to the columns, through the torsional corbel assemblies and to the runway beams.

The torsional corbel assembly 200 projects laterally from the plane of the line of columns 100 as shown in FIG. 3. The torsional corbel assembly 200 is attached (e.g, welded) to the tube 103 of the column 100 at the side plates 505 (see FIGS. 3 and 20). The torsional corbel assembly 200 defines a rigid support interface between the column 100 and the runway beams 500. In addition to vertically supporting the runway beams 500, the torsional corbel assembly 200 forms a moment-resisting connection between the runway beams 500 and the columns 100 in the x-direction. The torsional corbel assembly 200 is configured as a twisting lever to simultaneously resist torsional loads about the y-axis direction, bending moments due to vertical loads about the x-axis direction, and shear forces in the z-axis direction generated by crane operation, bridge travel, and seismic activity. In particular, torsional loads applied by the runway beams 500 are resisted by the torsional corbel assembly 200 so that the runway beams 500 remain rigidly supported and are not permitted to rotate relative to the column 100, as shown in FIGS. 20 and 21).

Figure 15:
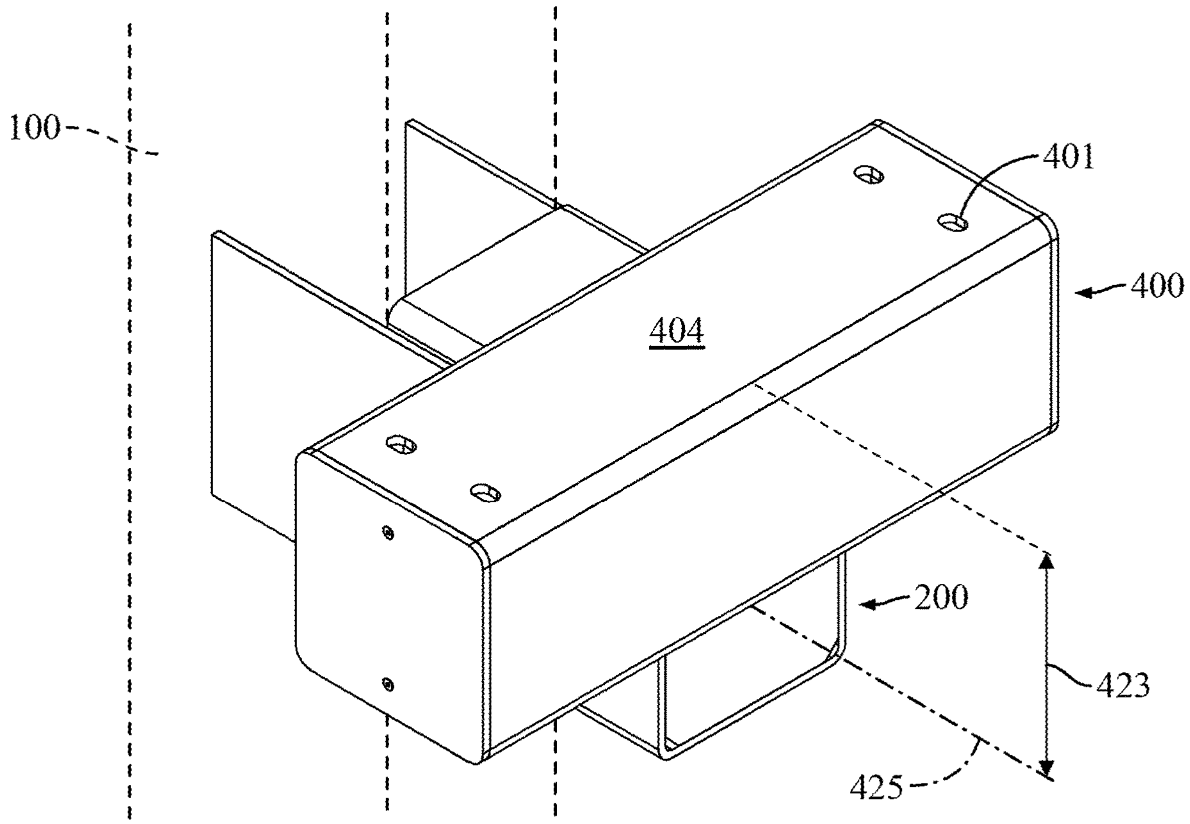
FIG. 15 is an isometric view of a torsional corbel assembly.
Figure 16:
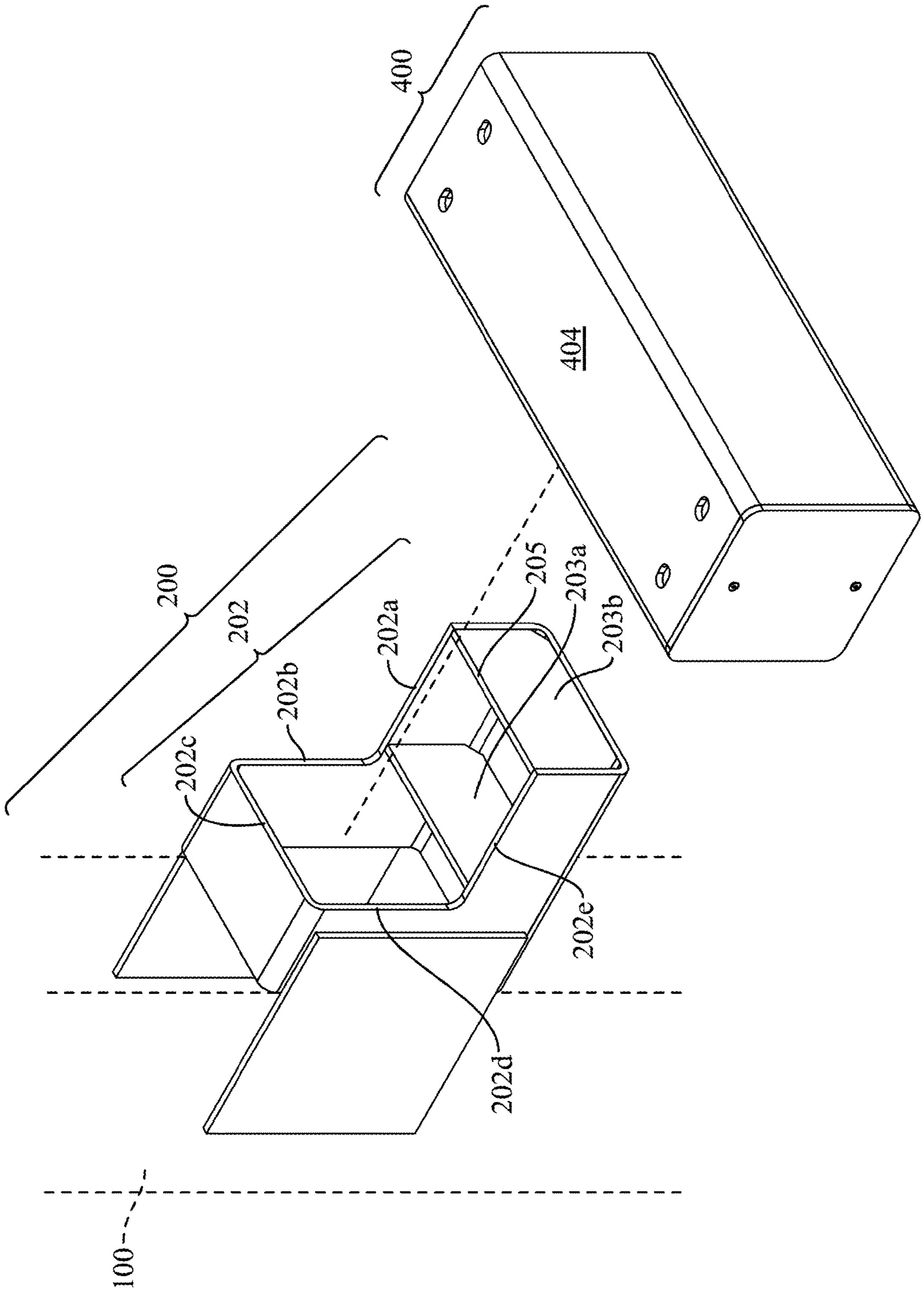
FIG. 16 is an exploded isometric view of a torsional corbel and a runway beam seat assembly.
Figure 22:
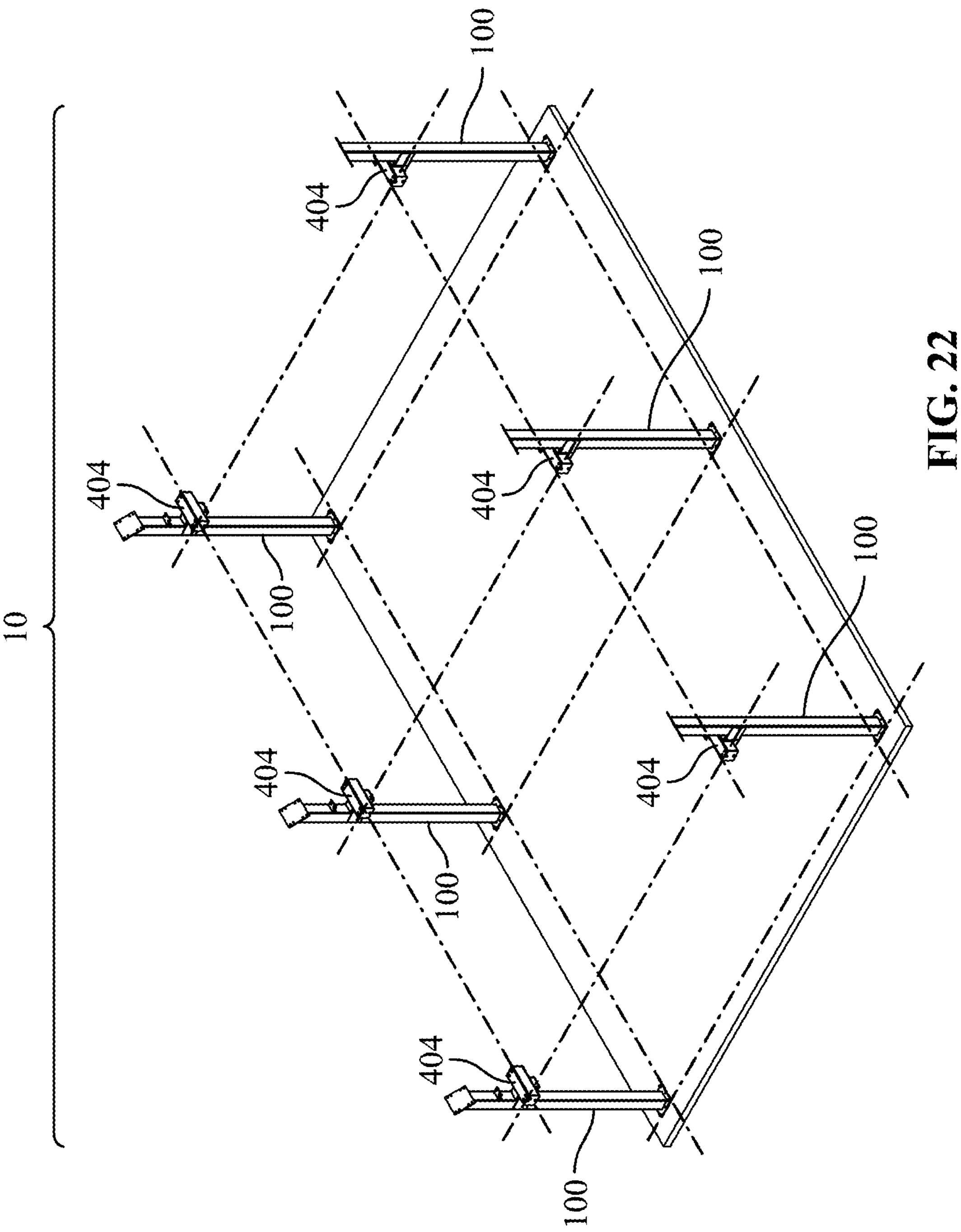
FIG. 22 illustrates a first step of installing the crane system including precise placement of the columns on a concrete slab.

As shown in FIG. 16, the runway beam seats 400 are fabricated and positioned on the torsional corbel assembly 200 so that their upper surfaces 404 (see FIGS. 15 and 22) are precisely aligned with one another. As shown in FIG. 22, the upper surfaces 404 lie in a common horizontal plane and define the vertical elevation of the supported runway beams 500. Because the runway beam seats 400 are rigidly fixed to the torsional corbel assembly 200, the forces imposed on the runway beams are transferred through the torsional corbel assembly 200 to the columns. Also, the forces imposed on the columns 100 (e.g., through seismic activity) are transferred through the torsional corbel assembly 200 to the runway beams 500.

The end portions 510 (see FIG. 4) of the adjacent runway beams 500 are cut square at substantially ninety-degree angles relative to the longitudinal axis of the runway beams 500. This precise cutting enables the adjacent runway beams 500 to be brought into direct end-to-end alignment when supported on the runway beam seats 400. Square-cut beam ends minimize angular deviation at the joint between adjacent runway beams 500 and prevent cumulative misalignment along the length of the crane system 10.

Figure 12:
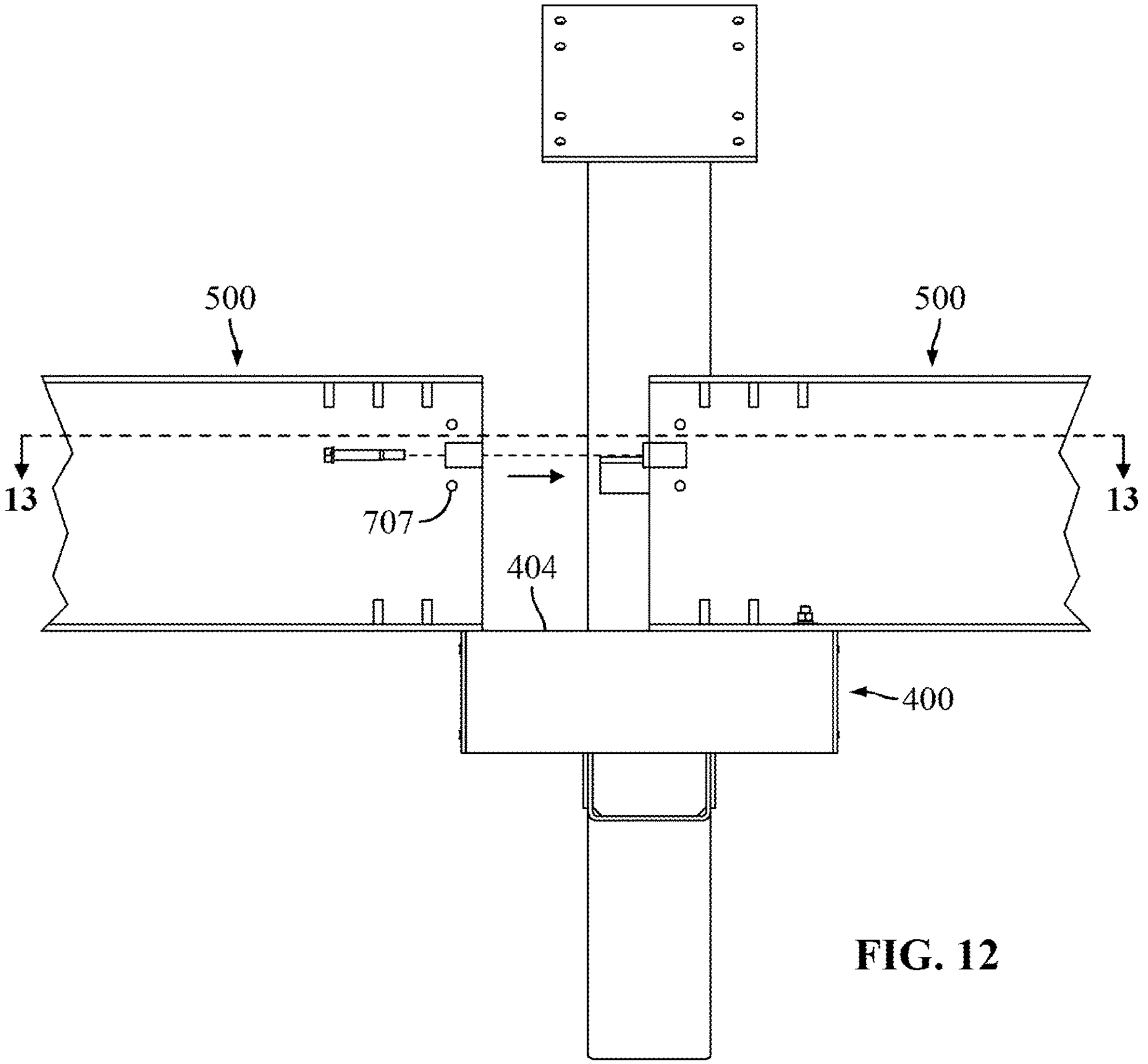
FIG. 12 is a front elevation view of adjacent runway beams supported by a torsional corbel assembly prior to connection by the alignment block assembly.
Figure 13:
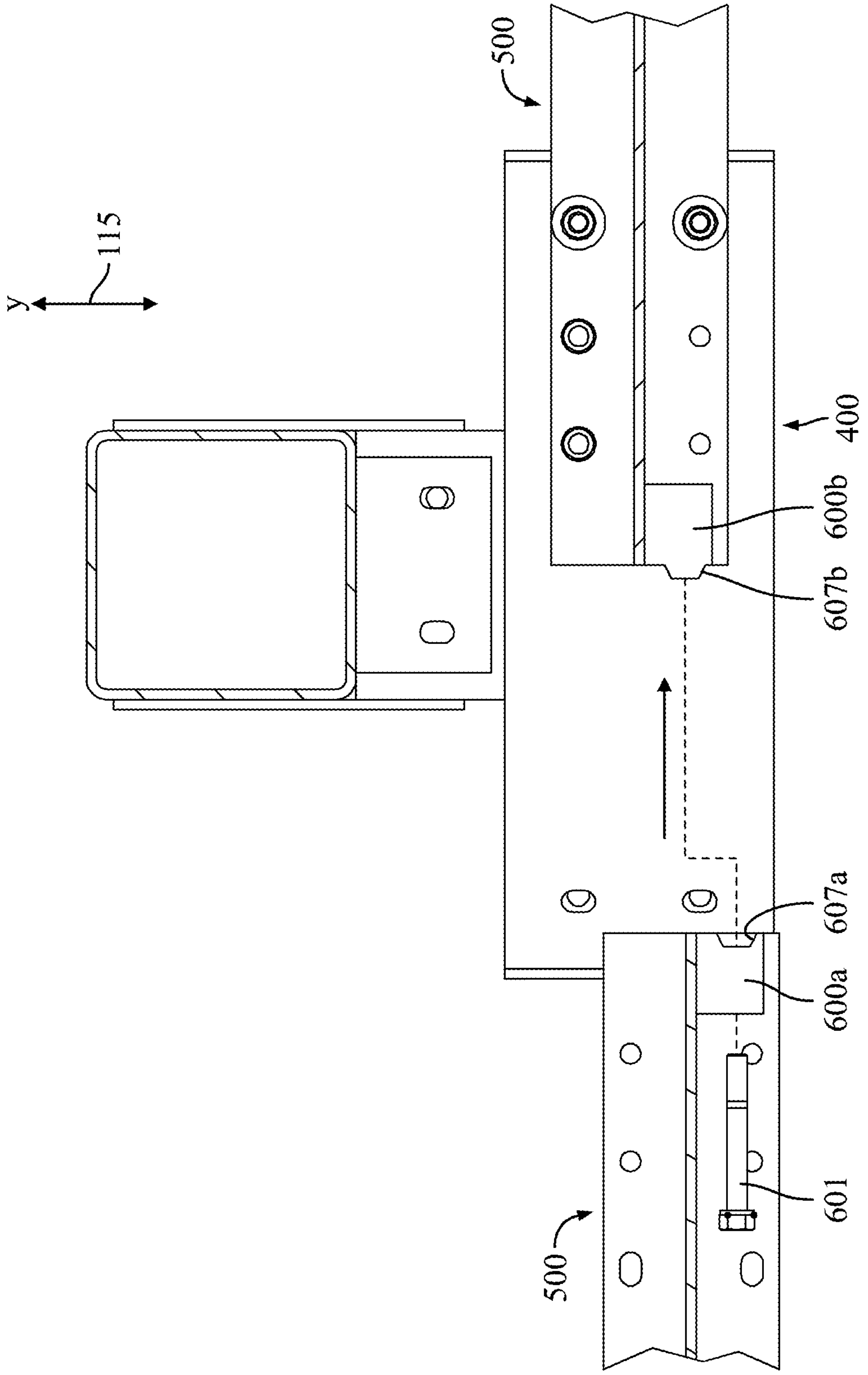
FIG. 13 is a cross-sectional view taken along line 13-13 of FIG. 12.

Referring now to FIGS. 11-14, alignment blocks 600*a, b* (see FIG. 11) are attached (e.g., welded) to the webs 504 of the adjacent runway beams 500 during fabrication. Runway beam 500 segments are carefully aligned before an alignment block assembly is attached to permanently memorialize the alignment. They are then resecured during installation to laterally align and completely close the gap between the runway beams 500 with a bolt 601. Initially upon placement, the adjacent runway beams may be misaligned in the y-direction 115 after the runway beams 500 are placed on the runway beam seat 400, as shown in FIG. 13. The bolt 601 is inserted into a through hole 603 of the alignment block 600*a* and engaged to a threaded hole 605 of the alignment block 600*b*. As the bolt 601 is tightened, alignment blocks 600*s* are secured to each other and the joint between the runway beam 500 segments self-aligns and closes. The alignment blocks 600*a, b* have a mating V-shaped notch 607*a* and protrusion 607*b*. The notch and protrusion are oriented vertically and only provide alignment in the y-direction 115. As the protrusion 607*b* enters the notch 607*a*, the V-shape aligns the alignment blocks 607*a, b* and the runway beams 500. The vertical alignment in the z-direction of the adjacent runway beams 500 is provided by the milled upper surface 404 of the runway beam seat 400, as shown in FIG. 12.

The square-cut end portions 510 of the adjacent runway beams 500 are brought into precise contact. This configuration guarantees alignment between the adjacent runway beams 500 in the transverse y-direction (see FIG. 13) and ensures that the runway beams 500 can be tightly contacting each other and remain straight and parallel over long spans.

Figure 9:
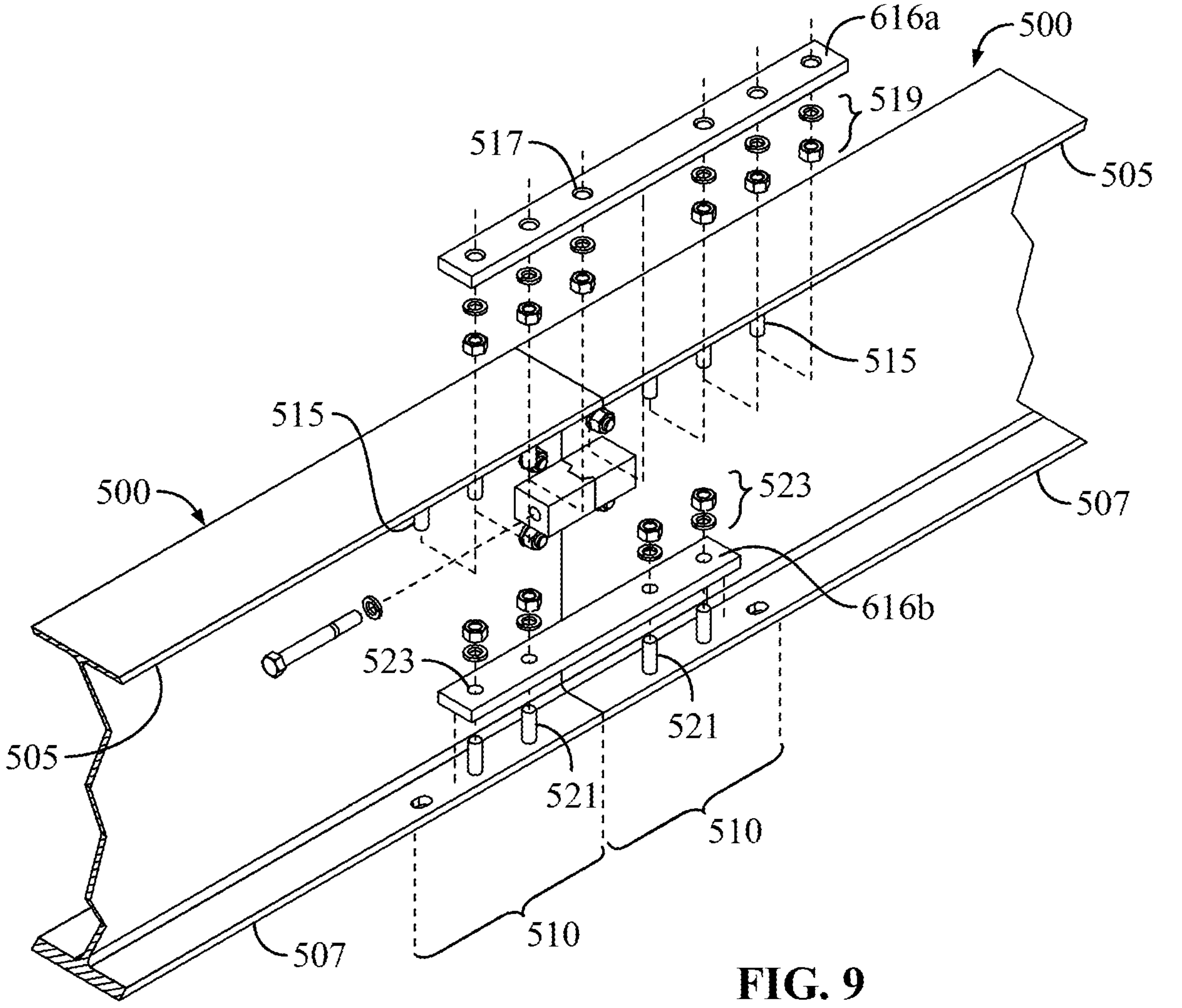
FIG. 9 is an exploded isometric view of an alignment block assembly and continuity bars for connecting adjacent runway beams.

As shown in FIG. 9, continuity bars 616*a, b* are attached to the adjacent runway beams 500 to connect the runway beams 500 to one another and to transfer forces in the longitudinal x-direction. The continuity bars 616 allow loads acting in the x-direction to be shared between adjacent runway beam sections. As a result, the connected runway beams 500 behave as a continuous structural member rather than as independent beam segments. This continuity improves load distribution, reduces localized stress at beam joints, and enhances seismic performance by allowing longitudinal forces to be distributed across multiple columns 100 and torsional corbel assemblies 200.

The top flanges 505 of the runway beams 500 have three fusion-welded threaded portions 515 that extend downward from the top flanges 505 for each of the end sections 510. A special fabrication jig that precisely places and aligns the fusion-welded studs is utilized during fabrication. The continuity bars 616*a* have six through-holes 517 which receive the threaded portions 515. The continuity bars 616*a* are bolted to the end sections 510 of the runway beams 500 with washers and nuts 519. There are two continuity bars 616*a* for each side of the top flange 505. The bottom flanges 507 of the runway beams 500 have two fusion-welded threaded portions 521 that extend upward from the bottom flanges 507 for each of the end sections 510. The continuity bars 616*b* have four through-holes 523 which receive the threaded portions 521. The continuity bars 616*b* are bolted to the end sections 510 of the runway beams 500 with washers and nuts 523. There are two continuity bars 616*b* for each side of the bottom flange 507.

The runway beams 500 shown in FIG. 2 are mechanically straightened along their entire length during fabrication and prior to installation on site to control camber, sweep, and twist. Specifically, mechanical straightening is used to control camber (bend in the middle when laid on the flange) to within one half to one eighth inch and preferably to within one quarter inch, sweep (bend in the middle when the beam is laid on its side) to within one half to one eighth inch and preferably to within one quarter inch, and twist, so as to ensure that the top and bottom flanges 505, 507 are made to be flat and parallel. Heat-straightening is not employed due to the detrimental effects the process can have on high-strength steel's metallurgical properties. Because the runway beams 500 are straight and precisely aligned at their supported ends, the connected runway beams 500 define a straight and continuous running surface suitable for ASCE rail-free bridge operation.

FIG. 3 illustrates a rear isometric view of the torsional corbel assembly 200 mounted to the column 100 and supporting the runway beams 500. The header 800 is shown connected to the column 100 at an upper portion thereof and provides transverse moment resistance in cooperation with the column 100. Although the forty-five-degree angled interface 105 between the header 800 and the column 100 is more clearly illustrated in other figures, FIG. 3 illustrates the structural relationship between the header 800, column 100, and torsional corbel assembly 200 within the assembled crane system 10.

In FIG. 3, a stability bracket 700 is shown connecting the column 100 to a web 504 of an adjacent runway beam 500. The stability bracket 700 restrains lateral movement (y-direction)-of the runway beam 500 relative to the column 100. By securing the stability bracket 700 to the web 504 of the runway beam 500 and the column 100, the system prevents y-direction forces from causing the wide-flange beams 500 to tilt in the y-direction. The stability bracket 700 prevents undesirable side-to-side movement of the runway beam during crane operation or seismic loading.

Figure 10:
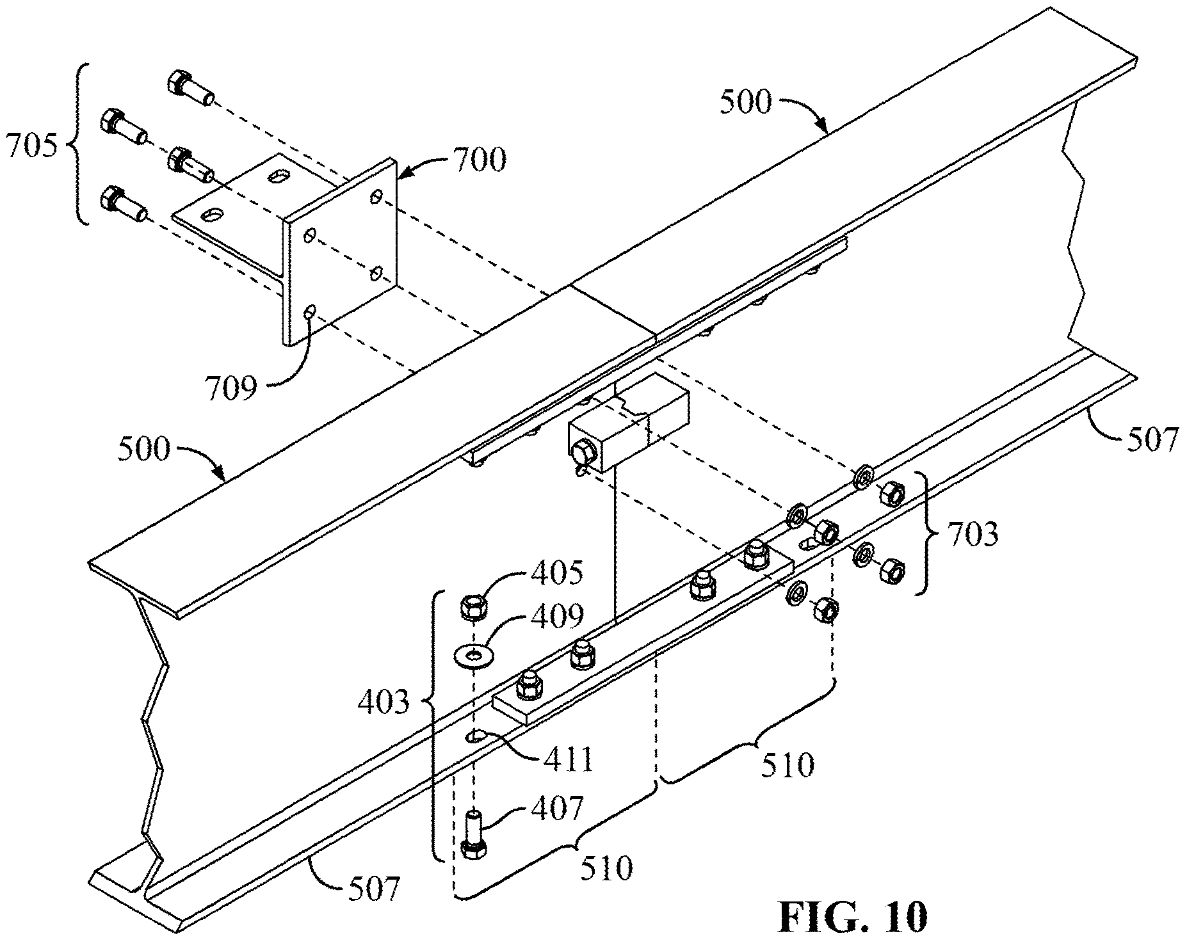
FIG. 10 is an exploded isometric view of a stability bracket mounted to adjacent runway beams.

As shown in FIGS. 3-5 and 10, the stability bracket 700 is bolted to the web 504 of the runway beam 500 and is bolted to the column 100 through a plate 701 that is pre-welded to the tube of the column 100. This pre-welded plate 701 provides a precise and repeatable mounting interface for the stability bracket 700 and allows the stability bracket 700 to be installed using bolted connections without field welding on the job site. By welding the plate to the column 100 under controlled manufacturing conditions, alignment accuracy and structural integrity are improved. As shown in FIG. 10, the stability bracket 700 is attached to the end sections 510 of adjacent runway beams 500 using nuts 703 and bolts 705. They are received into through holes 707 (see FIG. 12) in the webs of the runway beams and the through-holes 709 (see FIG. 10) formed in the stability bracket 700.

FIG. 3 further illustrates that the torsional corbel assembly 200 is attached to the tube of the column 100 with steel side plates 505, which transmit torsional forces from the runway beams 500 to the column 100. The tube of the columns 100, base plate 110, torsional corbel assembly 200, runway beam seat 400 and the 45-degree angled plates 111 at the top of the columns 100, are prefabricated as one unit at a manufacturing plant (off-site) before being delivered to the job site. Welding of the torsional corbel assembly 200 to the column 100 is performed under controlled shop conditions to ensure proper fit-up, alignment, and weld quality. As a result, the column 100 and torsional corbel assembly 200 are delivered to the job site as a preassembled unit, reducing installation time and eliminating the need for field welding.

FIG. 4 is an exploded isometric view illustrating the individual components that cooperate to support and align adjacent runway beams 500 on a column 100. The column 100 is shown together with the torsional corbel assembly 200, the runway beam seat 400, the runway beams 500, the alignment block assembly 600 attached to the runway beams, the continuity bars 616, and the header 800. This exploded view identifies the structural components and their relative positions prior to assembly.

The header 800 is shown as a separate structural member configured to be connected to the column 100 at an upper portion thereof. The headers 800 are also pre-built off-site and include matching 45-degree knee plates 113 at opposed ends. These mating 45-degree plates of the columns 100 and the headers 800 are configured to be attached to each other at the job site using nuts 801 and bolts 803 (see FIG. 5). This geometry allows the header 800 to be bolted to the column 100 to form a rigid, moment-resisting connection. The angled interface improves force transfer between the header 800 and the column 100 and enhances resistance to transverse seismic forces by distributing loads over a larger contact area.

The torsional corbel assembly 200 is shown mounted to the column 100 and includes the corbel 202 and associated structural members configured to project outward from the column 100. The torsional corbel assembly 200 is welded to the tube of the column 100 prior to installation and forms a rigid load-transfer interface capable of resisting torsional loads, bending moments, and shear forces applied by the runway beams 500. Because the torsional corbel assembly 200 is welded to the tube of the column 100 under controlled shop conditions, the alignment and squareness of the assembly are tightly controlled.

The runway beam seats 400 are shown positioned on the torsional corbel assembly 200. Each runway beam seat 400 is configured to receive and support adjacent end portions 510 of adjacent runway beams 500, as shown in FIG. 2. The upper surface 404 of the runway beam seat 400 may be machined or milled to ensure high-precision flatness. The runway beam seat 400 further includes transverse slotted holes 401 (see FIG. 15) to permit final field alignment of the runway beams 500 in the y-direction. As shown in FIGS. 2, 3, 6, and 10, the runway beams 500 are attached to the runway beam seats 400 via a bolted connection 403 including nuts 405, bolts 407, and washer 409. The bolts 407 are inserted through slotted through-holes 401 (see FIG. 15)

formed in the top surface 404 of the runway beam seats 400 and through-holes 411 (see FIG. 10) of the runway beam 500 formed in the bottom flange 507. The runway beam seats 400 include upper surfaces 404 that are flat and level and lie in a common horizontal plane when installed. These upper surfaces 404 define the vertical elevation of the runway beams 500 and provide a precise bearing interface that fixes the position of the runway beams 500 in the vertical direction.

The end portions 510 of the runway beams 500 are cut square at substantially ninety-degree angles relative to the longitudinal axis of the runway beams 500. This square cutting allows the runway beams 500 to seat evenly on the upper surfaces 404 of the runway beam seats 400 and to be brought into direct end-to-end contact during installation.

The alignment block assembly 600 is shown as a multi-part component configured to attach to the webs 504 of the adjacent runway beams 500. The alignment block assembly 600 includes mating components that are drawn together by a fastener to pull the adjacent runway beams 500 toward one another. As the alignment block assembly 600 is tightened, misalignment between the adjacent runway beams 500 in the transverse direction is corrected, and the square-cut end portions 510 are brought into precise contact.

Continuity bars 616 are shown as elongated members configured to connect the adjacent runway beams 500 to one another. The continuity bars 616 transfer forces along the longitudinal direction of the crane system 10 so that the connected runway beams 500 behave as a continuous structural member. This continuity improves load sharing, reduces stress concentrations at beam joints, and enhances seismic performance by allowing longitudinal forces to be distributed across multiple columns 100.

Figure 5:
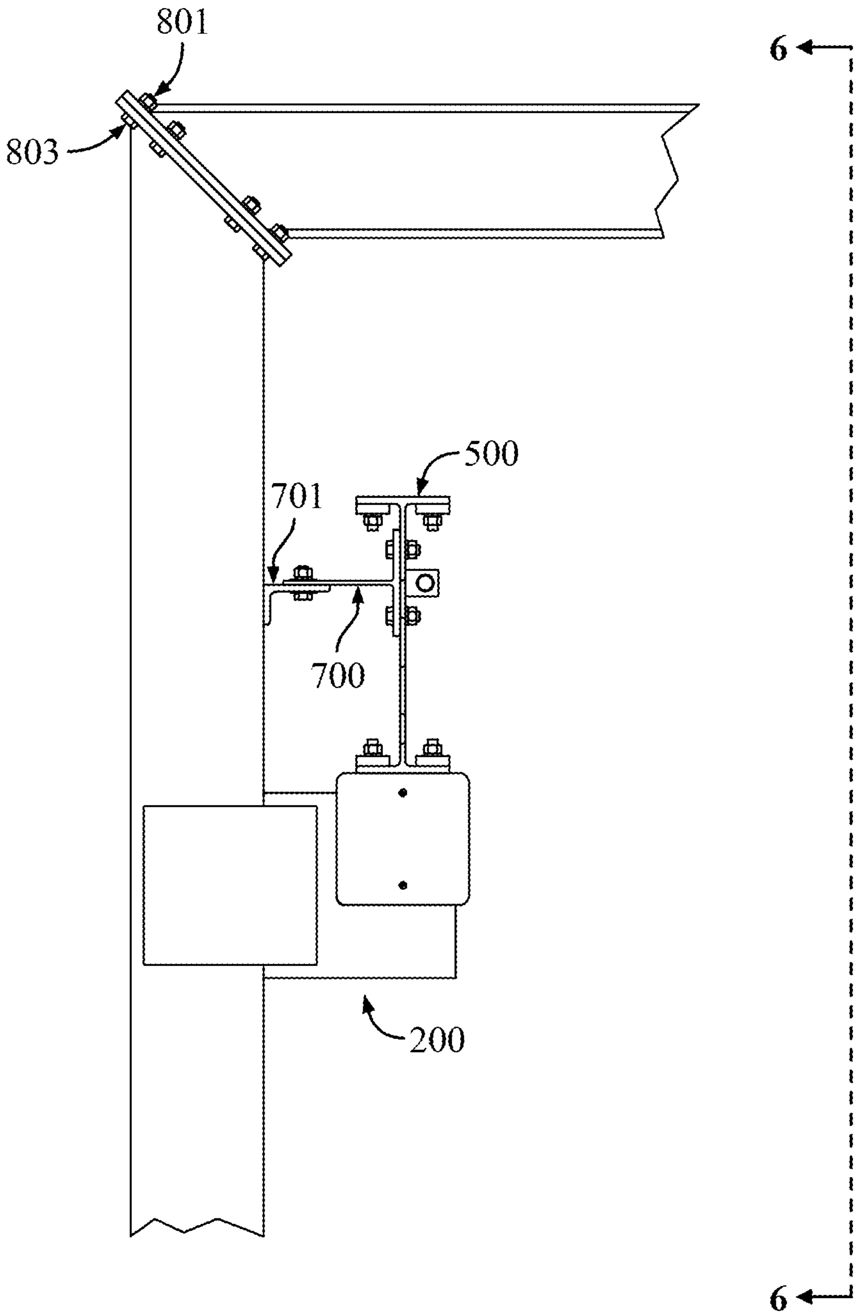
FIG. 5 is a side elevation view of the torsional corbel assembly attached to the column and supporting adjacent runway beam shown in FIGS. 2 and 3.

FIG. 5 illustrates a side elevation view of the torsional corbel assembly 200 mounted to the column 100 and supporting runway beam 500. In this view, a stability bracket 700 is shown attached to the column 100 and to a web 504 of an adjacent runway beam 500. The stability bracket 700 is secured to the column 100 through a plate 701 that is pre-welded to the column 100 and is secured to the web 504 of the runway beam 500 using fasteners. This bracket configuration prevents forces in the y-direction from tilting the wide-flange beams 500.

FIG. 5 further illustrates that the runway beams 500 are straight along their length when supported by the torsional corbel assemblies 200 and the runway beam seats 400. This straightness results from mechanical straightening of the runway beams 500 prior to installation and from precise alignment of the runway beam seats 400 on the torsional corbel assemblies 200. In addition, the alignment block assemblies 600 ensure alignment of adjacent runway beams 500 in the transverse y-direction by drawing the adjacent runway beams 500 into proper alignment relative to one another. Because the runway beams 500 are straight and parallel, the bridge 14 may travel along the runway beams 500 without the need for separate crane rails (e.g., ASCE rails) which would be mounted on the runway beams 500.

Figure 6:
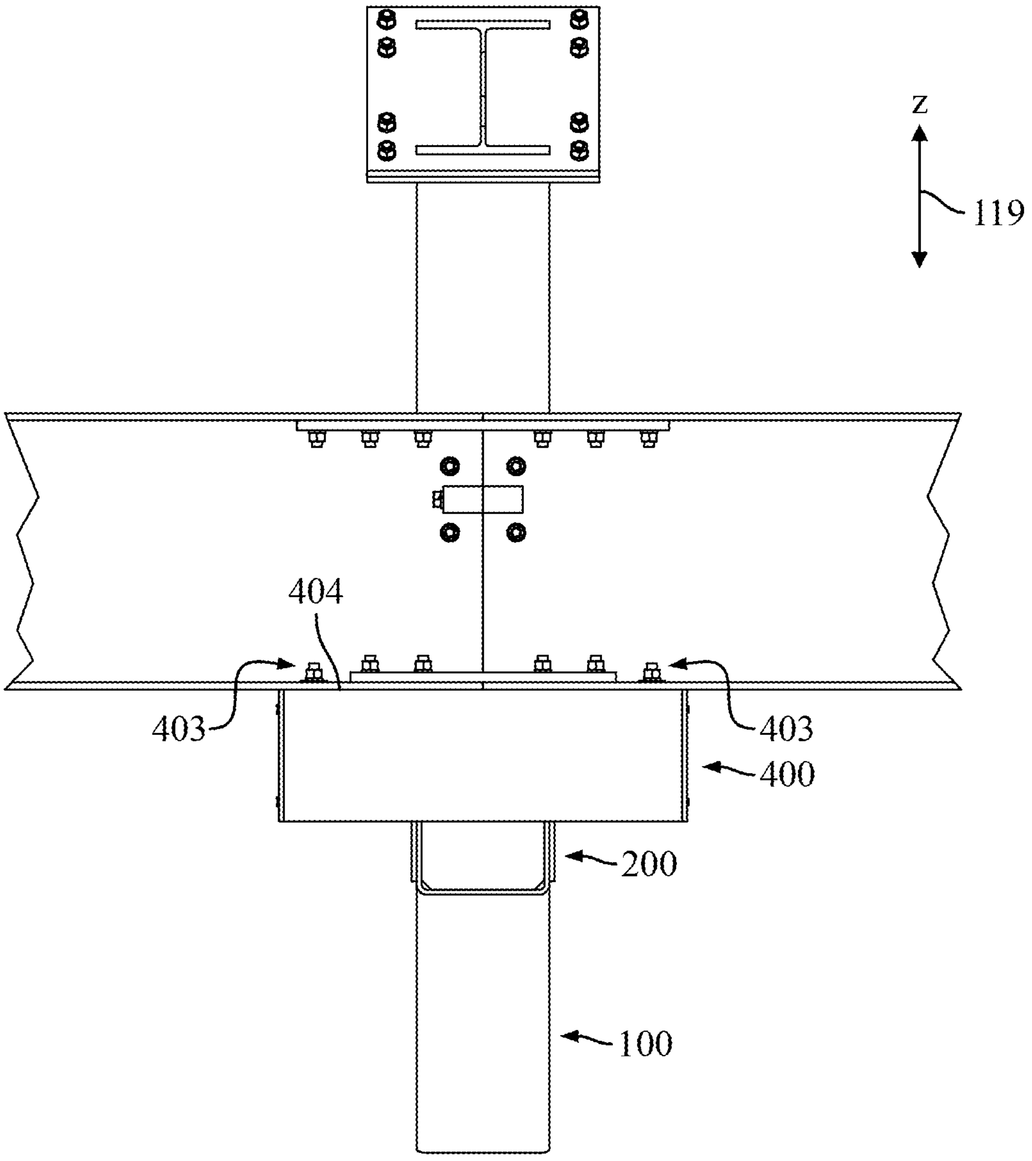
FIG. 6 is a front elevation view of the torsional corbel assembly mounted to the column and supporting adjacent runway beam segments shown in FIG. 5.

FIG. 6 illustrates a front elevation view of the torsional corbel assembly 200 mounted to the column 100 and supporting adjacent runway beams 500. In this view, the end portions 510 of the adjacent runway beams 500 are shown resting on corresponding runway beam seats 400. The upper surfaces 404 of the runway beam seats 400 are flat and level relative to one another, such that the supported end portions 510 of the adjacent runway beams 500 are positioned at the same elevation.

Because the end portions 510 of the runway beams 500 are cut square at substantially ninety-degree angles, the end faces of the runway beams 500 seat evenly on the upper surfaces 404 of the runway beam seats 400. Any misalignment between the adjacent runway beams 500 in the vertical direction is corrected as the beams are supported by the flat and level upper surfaces 404. As a result, the runway beams 500 are leveled in the z-direction 119 and cooperate to define a continuous and level running surface suitable for ASCE rail-free bridge operation.

Together, FIGS. 4-6 illustrate how the torsional corbel assembly 200, runway beam seats 400, alignment block assemblies 600, continuity bars 616, and stability brackets 700 cooperate to precisely align adjacent runway beams 500, resist torsional and lateral loads, and provide a straight, level, and continuous running surface for the bridge 14 without the need for separate crane rails.

FIG. 15 is an isometric view of the torsional corbel assembly 200 and the runway beam seat 400. The torsional corbel assembly 200 is shown extending outward from the tube of column 100. As shown in FIG. 16, a corbel 202 formed from a tube (or rectangular steel member) that is cut and oriented into an L-configuration to project laterally from the tube of the column 100. The rectangular tube 202 forms a closed structural section when the runway beam seat 400 is welded to the open cut edges of the corbel 202 which then provides high resistance to torsional deformation when loads are applied by the runway beams 500. In particular, all of the open edges 202*a, b, c, d, e, f* are welded to the exterior surface of the beam seat 400 to form the closed section. Additional interior gussets 203*a, b* may be provided within the rectangular tube to distribute torsional stresses. These gussets 203*a, b* may be welded to the interior surfaces of the rectangular tube. The gusset 203*b* at edge 205 may be welded to the exterior surface of the beam seat 400 to form the closed section.

After cutting the corbel 202, the corbel has an open section configuration. When the runway beam seat 400 is welded to the corbel 202, the corbel then becomes a closed section configuration. The weld is from any edge of the corbel which contacts the runway beam seat 400. The closed-section geometry of the torsional corbel assembly 200 allows the assembly to remain rigid when subjected to torsional loads generated by bridge travel, hoist movement, and seismic activity. Unlike open-section brackets or cantilever plates, the torsional corbel assembly 200 resists twisting and local deformation, thereby maintaining the vertical and rotational alignment of the runway beam seats 400 supported thereon. By way of example, a cross section (or simply "section") that is closed will have no free ends, like the letter "O" or a rectangle. An open section has free ends like a letter "H" or "X". Closed sections are resistant to torsional forces, whereas open sections provide little resistance to torsional forces.

The structural efficiency of the assembly is optimized by cutting the rectangular tube of the corbel 202 and welding the runway beam seat 400 directly to the resulting open cut edges. This specific configuration ensures that the runway beam seat 400 functions as a structural cap, transforming the corbel into a closed section with high torsional rigidity. By integrating the seat into the corbel rather than stacking and welding it on top of an uncut or unnotched corbel 202, a distance 423 (see FIG. 15) from the upper bearing surface 404 of the runway seat to the central longitudinal axis 425 of the corbel is significantly reduced. This reduction in vertical offset minimizes the moment arm through which gravity and seismic loads act upon the assembly, thereby decreasing the rotational stress (torque) applied to the column 100 and enhancing the overall stability of the frame without the need for external bracing. When the torsional corbel assembly undergoes a torsional load 427 (see FIG. 2), the shorter distance 425 facilitates transfer of the load from the runway beam to the columns and vice versa.

Figure 17:
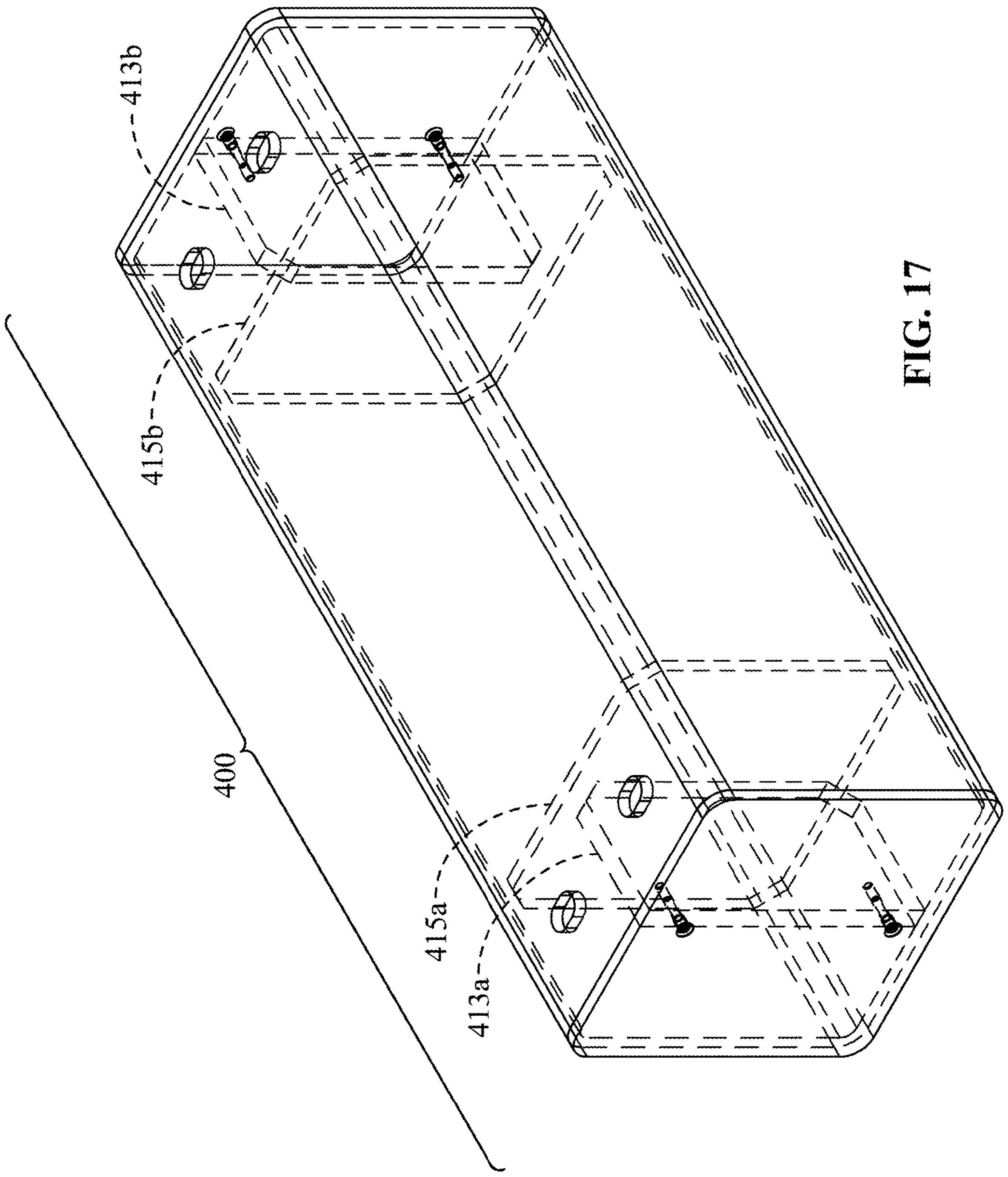
FIG. 17 is a transparent isometric view of a runway beam seat assembly illustrating internal gussets.

FIG. 17 is a transparent isometric view of the runway beam seat assembly 400 illustrating internal reinforcement. In this view, the runway beam seat 400 comprises a rectangular tube including internal gussets positioned within the rectangular tube structure. Specifically, the reinforcement includes left and right first gussets 413*a, b* and left and right second gussets 415*a, b* located within the rectangular tube. The gussets 413*a, b* are aligned to the longitudinal axis of the runway beam seat 400. The gussets 415*a, b* are aligned transverse to the longitudinal axis of the runway beam seat. These gussets 413*a, b* and 415*a, b* may be welded to the interior surface of the tube of the runway beam seat 400. These internal gussets distribute loads applied by the supported runway beam 500 into the walls of the rectangular tube and prevent local buckling or deformation under vertical, torsional, and bending loads.

The internal gussets are preferably formed from structural steel with a thickness of ⅜ to ½ inch. They are positioned within the rectangular tube at locations that transmit force to the tubes and prevent the tube walls from buckling, reinforcing the rectangular beam seat 400 so that it can withstand high torsional loads. The internal gussets ensure that the upper surface 404 of the runway beam seat 400 remains flat and level under load, thereby preserving the vertical alignment of the runway beams 500. By reinforcing the runway beam seat 400 internally, the crane system 10 maintains precise alignment without relying on excessively thick external plates or additional external bracing.

Figure 18:
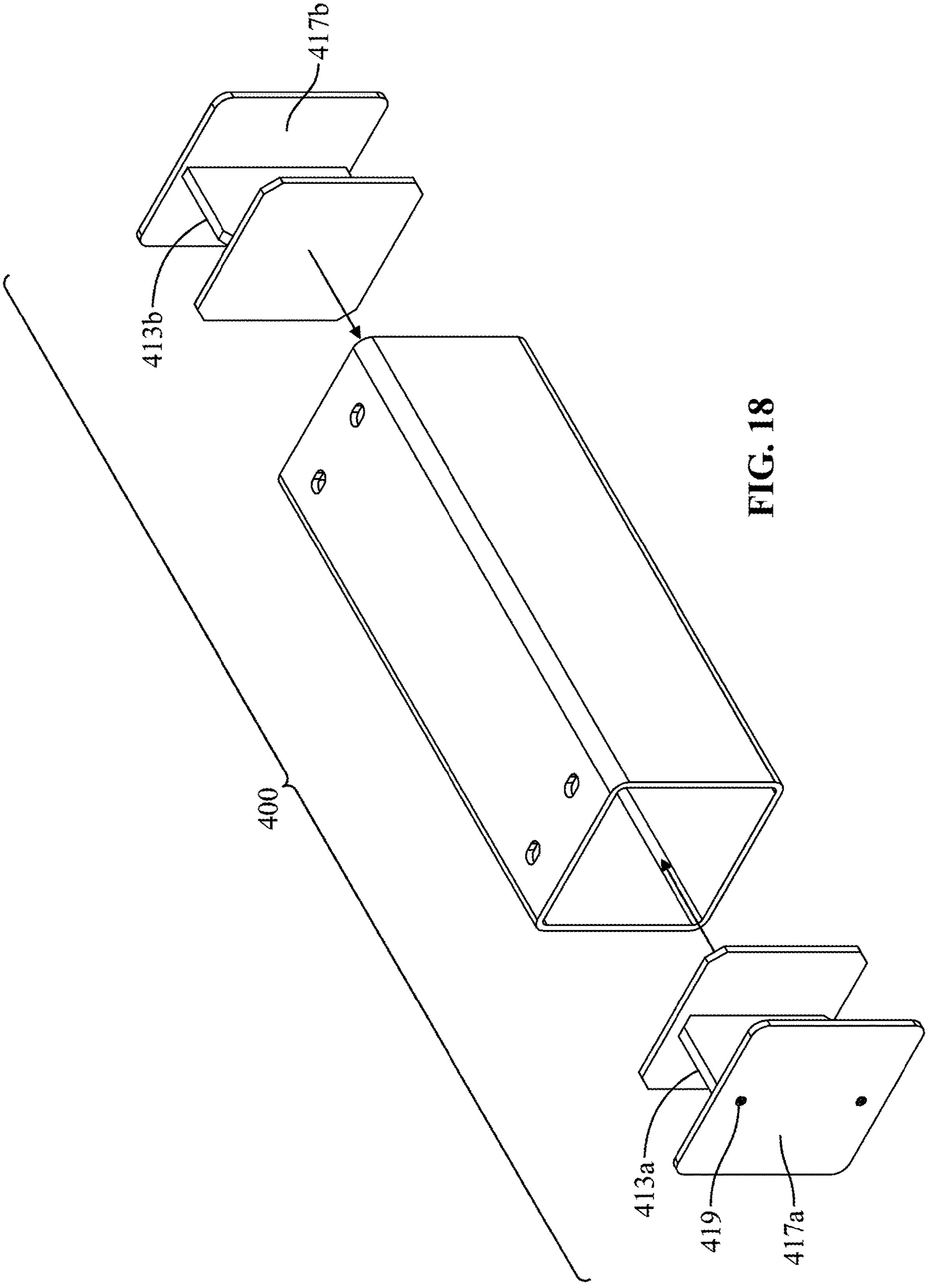
FIG. 18 is an exploded isometric view of a runway beam seat assembly including associated mounting plates.
Figure 19:
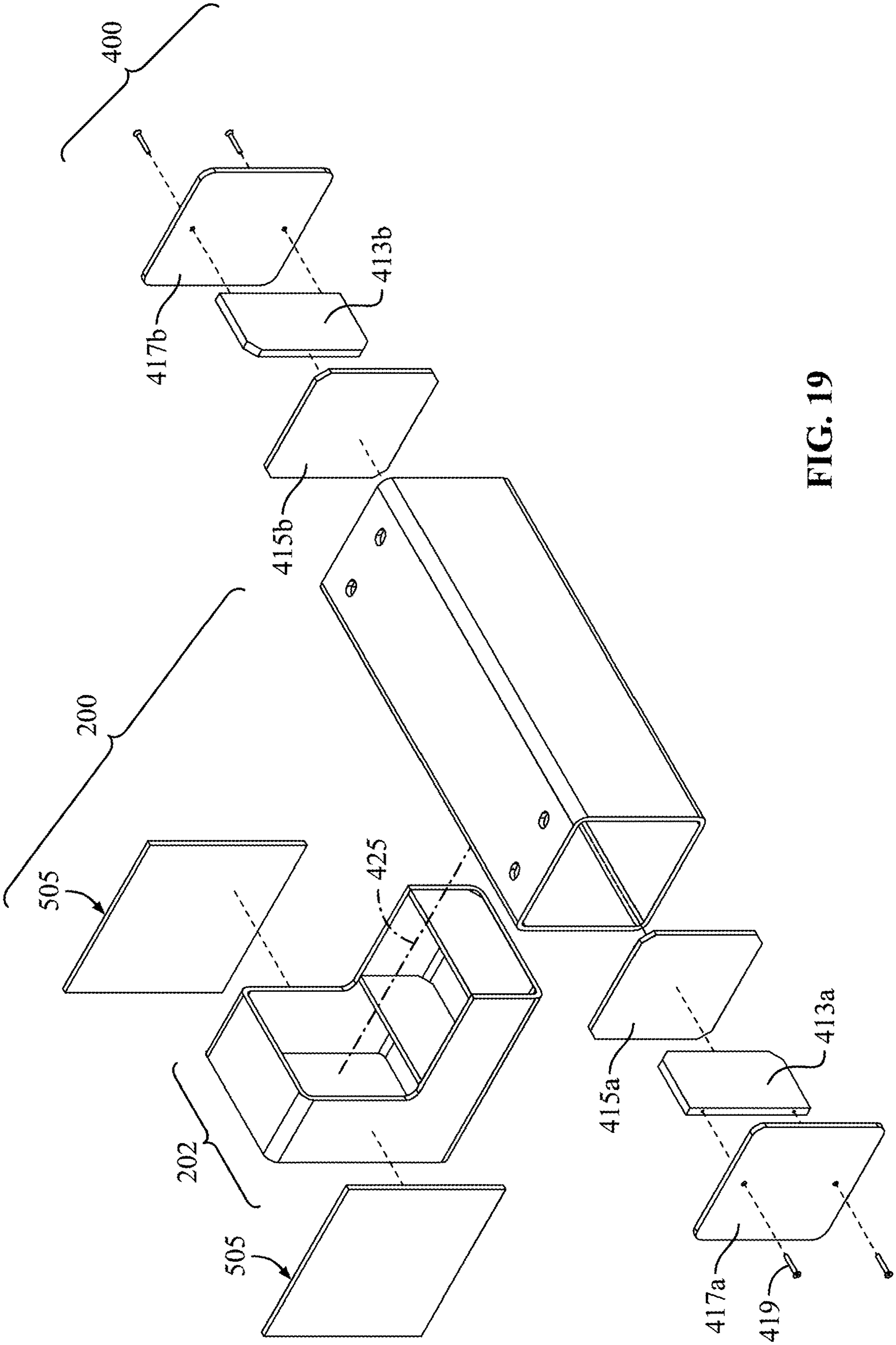
FIG. 19 is an exploded isometric view of the torsional corbel assembly including reinforcement plates and fasteners.

FIG. 18 is an exploded isometric view of the runway beam seat assembly 400 including associated gussets 413*a, b* and 415*a, b*. It also includes cover plates 417*a, b* which prevent wildlife from forming a nest inside the runway beam seat 400. The cover plates 417*a, b* may be screwed onto the gussets 413*a, b* with screws 419. FIG. 19 is an exploded isometric view of the torsional corbel assembly 200 including reinforcement plates and fasteners. In this view, reinforcement gussets are shown positioned at end portions of the corbel 202. These include a first reinforcement gusset at the distal end of the corbel 202 and a second reinforcement gusset inwardly offset from the distal end of the corbel 202. These gussets reinforce the torsional corbel assembly 200 by distributing stresses throughout the closed-section structure and by increasing resistance to torsional and bending loads.

FIG. 20 illustrates the crane system 10 in a normal, non-seismic condition. In this configuration, the columns 100 are vertically aligned and support the runway beams 500 through the torsional corbel assemblies 200 and runway beam seats 400. The runway beams 500 are connected end-to-end by alignment block assemblies 600 and continuity bars 616, and the columns 100 are interconnected by headers 800 to form a self-supporting structural frame. In this condition, gravity loads from the bridge 14, hoist 18, and lifted loads are transferred through the runway beams 500, torsional corbel assemblies 200, columns 100, and into the concrete slab 116 primarily as concentric flexural and shear forces. As the hoist 18 moves along the bridge 14 or the bridge 14 moves along the runway beams 500, the lifted load can be positioned anywhere within the envelope of the crane system 10. The hook of the hoist 18 performs the lifting and lowering of the load in the z-direction. The system is designed such that the area of the slab 116 where the columns 100 are supported does not require reinforcement beyond the existing six-inch thickness, even when designed for a high-capacity rating of up to 20 tons.

FIG. 21 illustrates the crane system 10 during a seismic event in which ground motion causes the concrete slab 116 and the bases of the columns 100 to move laterally. In particular, FIG. 21 illustrates seismic motion in the longitudinal direction, namely the x-direction 117, in which the ground shakes back and forth beneath the crane system 10. As a result of this ground motion, the bases of the columns 100 are displaced in the x-direction, causing the columns 100 to bend elastically in response to the imposed seismic forces.

During such longitudinal seismic motion, the torsional corbel assemblies 200 prevent bending and rotation at the interface between the columns 100 and the runway beams 500. Although the columns 100 may bend with ground motion, the torsional corbel assemblies 200 remain rigid due to their closed-section construction and internal reinforcement. This rigidity prevents relative rotation between the runway beam seats 400 and the columns 100, allowing the runway beam assemblies to remain straight, aligned, and structurally continuous during seismic excitation. Due to the rigidity of the torsional corbel assembly, the tube of the columns 100 bends or deflects below the torsional corbel assembly 200. The assembly at and above the torsional corbel assemblies 200 flex less compared to the columns below the torsional corbel assembly 200.

FIG. 21 further illustrates that longitudinal seismic forces applied to the runway beams 500 are transferred between adjacent runway beam sections by the continuity bars 616. As the ground shakes in the x-direction, forces transmitted from the torsional corbel assemblies 200 into the runway beams 500 are shared across adjacent runway beam sections through the continuity bars 616. This force transfer causes the connected runway beams 500 to behave as a continuous structural member in the longitudinal direction rather than as independent beam segments.

By distributing seismic forces across multiple runway beam sections and multiple columns 100, the continuity bars 616 induce end moments at individual beam joints and corbel interfaces. This distributed load path improves the overall seismic performance of the crane system 10 and strengthens the system to be able to resist localized damage during an earthquake, or other lateral loads which occur during normal operation.

FIG. 22 illustrates a first step in installing the crane system 10 in which the columns 100 are attached to the concrete slab 116. This first step includes precision drilling the holes for the anchor bolts 122 at the proper locations using the alignment procedures. The alignment procedure is used to precisely place all of the concrete anchors 120 for all of the columns 100 of the crane system 10 so that the anchors 120 are parallel to each other in both the x-direction and the y-direction, ensuring that all columns 100 are accurately spaced relative to one another and aligned with the intended crane geometry. As part of the first step, the anchor bolts 122 are attached to the concrete slab 116. Holes are drilled into the concrete slab 116 at the laser-defined locations, and the post-installed anchors 120 are installed into the drilled holes according to their rated installation procedures. The anchors 120 may be mechanical anchors, adhesive anchors, or other suitable post-installed anchors capable of supporting the vertical and lateral loads imposed by the crane system 10. Once installed, the anchors 120 project upward (see FIG. 27) from the concrete slab 116 to receive the base plates 110 of the columns 100.

Figure 28:
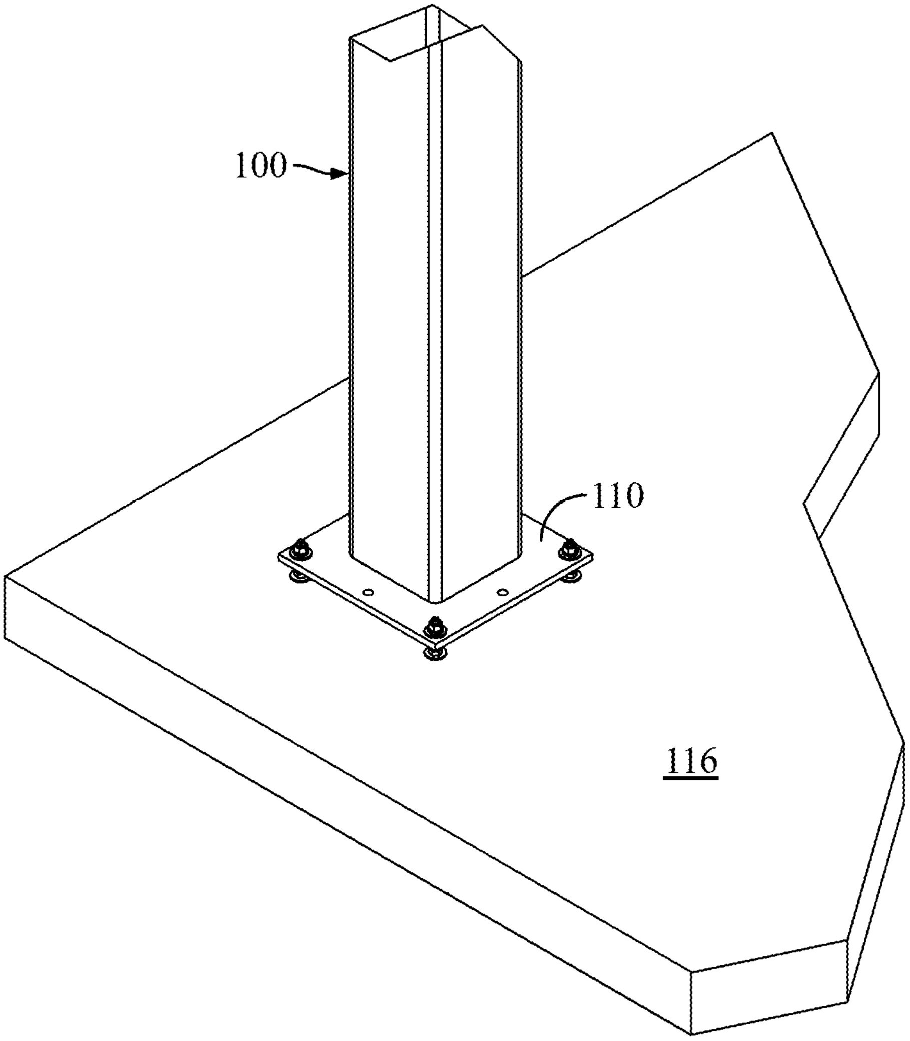
FIG. 28 is an isometric view of the column base plate secured to the concrete slab using anchors.

The base plates 110 are placed over the anchors 120, and washers 126 and nuts 124 are threaded onto the anchors 120 both below and above the base plates 110, as shown in FIGS. 27 and 28. Specifically, four nuts 124 and four washers 126 are attached to the top of the four anchor bolts 122, and the base plate 110 is placed on top of these lower nuts and washers. Subsequently, four additional nuts 124 and four washers 126 are attached to the anchor bolts 122 on top of the base plate 110. In this configuration, the base plate 110 is sandwiched between the lower nuts and washers and the upper nuts and washers. By adjusting the lower nuts 124 upward or downward on the anchors 120, the installer can precisely adjust the vertical position of each column 100 and the heights of the runway beam seats 400. This adjustment allows the columns 100 to be set plumb in both the x-direction and the y-direction and allows the elevations (z-direction) of the columns 100 to be fine-tuned so that the runway beam seats 400 supported by the torsional corbel assemblies 200 will lie at precise and consistent heights.

The column 100 is adjusted to be vertical so that it does not lean in either the x-direction or y-directions. This is accomplished by adjusting the lower four nuts and washers up and down using a bubble and laser system. With the use of the bubble and laser system, the installer ensures the column 100 is vertical and that the top surfaces of all runway beam seats 400 are adjusted to be in a common horizontal plane and parallel to each other. Once the columns 100 are accurately positioned, they are secured by tightening the top four nuts 124 and washers 126 onto the base plate 110 of the column 100. In this manner, precise adjustment of the lower nuts 124 allows the installer to establish system-level precision at the column base.

Figure 23:
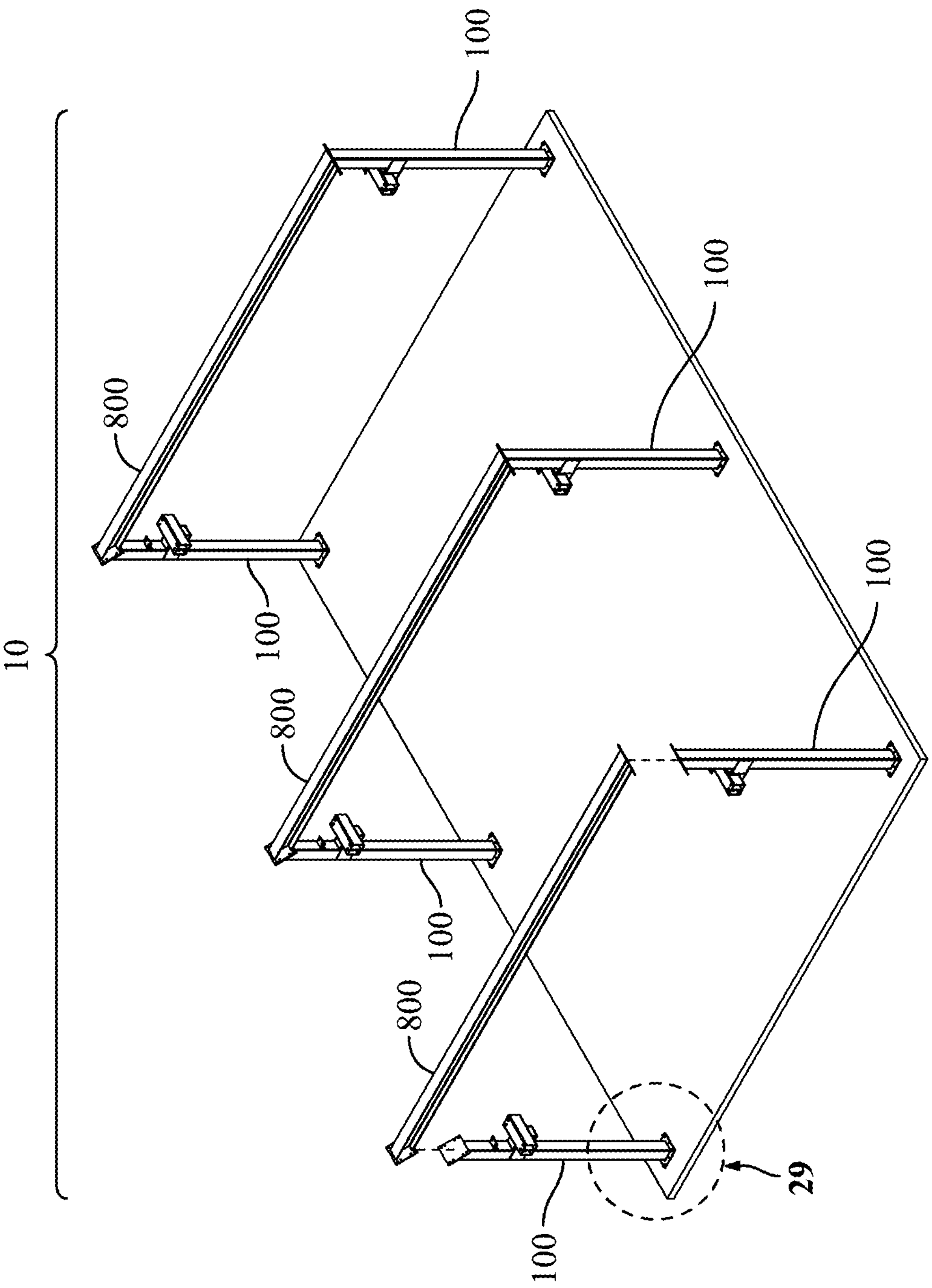
FIG. 23 illustrates a second step of installing the crane system including connecting headers to the columns.

FIG. 23 illustrates a second step in the installation method, which consists of attaching the headers 800 to the columns 100. Once the columns 100 are positioned at the correct locations, plumbed, and adjusted to the desired elevation, the headers 800 are attached to the columns 100. The headers 800 are connected at upper portions of the columns 100 using bolted connections joining the 45-degree knee plates of the headers to the matching 45-degree plates of the columns.

Figure 24:
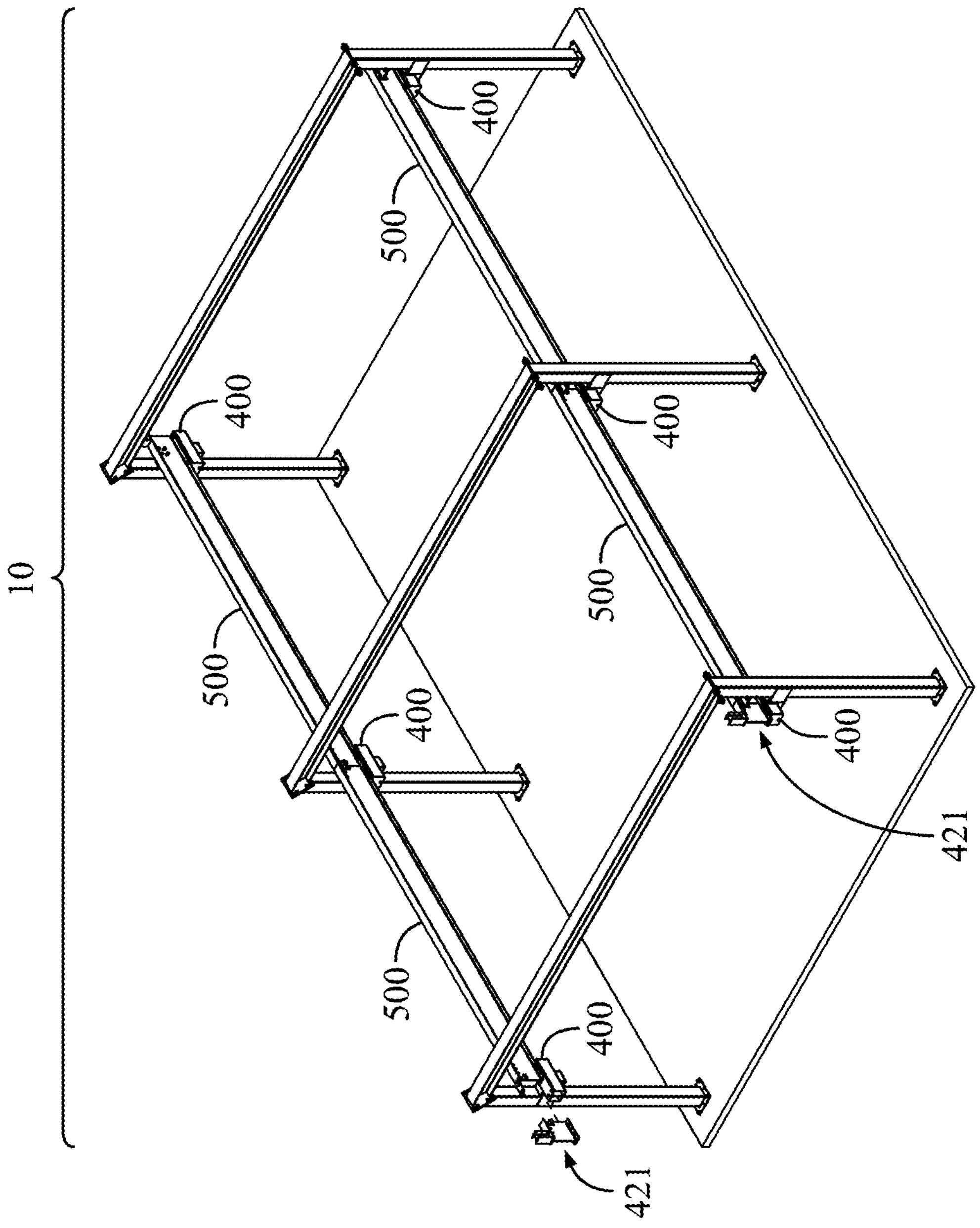
FIG. 24 illustrates a third step of installing the crane system including mounting the runway beams to beam seats of the torsional corbel assemblies.

FIG. 24 illustrates a third step in the installation of the crane system 10, which involves attaching the runway beams 500 to the runway beam seats 400 of the torsional corbel assemblies 200. In this step, the end portions 510 of the runway beams 500 are placed directly onto the flat and level upper surfaces 404 of the runway beam seats 400, as shown in FIG. 12. Because the runway beam seats 400 are precisely positioned and lie in a common horizontal plane, the runway beams 500 are immediately supported at the correct elevation without the need for shims or field machining. The third step further includes attaching adjacent runway beam segments with the alignment block assembly 600 and attaching adjacent runway beam segments with the continuity bars 616. The runway beams are also fastened to the runway beam seats 400, as discussed herein.

FIG. 24 further illustrates the modular and expandable nature of the crane system 10. Additional columns 100 may be installed along the length of the crane system 10, typically at 30-foot column centers, and additional runway beam sections 500 may be added to extend the crane system 10 in the longitudinal direction. The use of standardized runway beam sections 500, alignment block assemblies 600, and continuity bars 616 allows the crane system 10 to be lengthened after initial installation without redesigning the existing structure. As shown, at the opposed ends of the crane 10, the last runway beam seat 400 may have a short runway beam 421 which has an upward block which prevents the bridge from rolling off of the crane. To extend the length of the crane system 10, the short runway beam 421 is removed and additional columns 100, header 800 and runway beams 500 are added on.

In addition, FIG. 24 illustrates that the crane system 10 may be widened by positioning the columns 100 farther apart in the transverse direction. By increasing the spacing between the columns 100, installing longer headers 800, and using a correspondingly longer bridge 14, the width of the crane system 10 can be increased to accommodate larger work areas or equipment. This flexibility allows the crane system 10 to be configured for a wide range of building layouts and operational requirements.

FIG. 25 illustrates a cross-sectional side elevation view of the crane system 10 after installation of the runway beams 500. In this view, the runway beams 500 are shown supported on the runway beam seats 400 of the torsional corbel assemblies 200 and stabilized relative to the columns 100 by the stability brackets 700. The runway beams 500 are straight, level, and parallel due to mechanical straightening during fabrication, precise alignment of adjacent beam sections using the alignment block assemblies 600, and vertical leveling provided by the flat and level upper surfaces 404 of the runway beam seats 400.

Because of this precision, the crane system 10 does not require separate crane rails mounted on top of the runway beams 500. Instead, the bridge 14 travels directly on the upper surfaces of the runway beams 500 using bridge end truck wheels 900. The bridge 14 spans the distance between the parallel runway beams 500 and traverses the entire connected length of the runway assembly. As shown in FIG. 25, each bridge end truck wheels 900 is positioned directly above the web 504 of the corresponding runway beam 500 so that vertical loads from the bridge 14, hoist 18, and lifted loads are transferred directly into the web 504, which is the strongest portion of the runway beam 500. The hoist 18 allows for movement of the lifted load along the bridge 14 in the y-direction, while the hook of the hoist 18 provides lifting capability in the z-direction. This load path minimizes bending in the flanges of the runway beams 500 and improves structural efficiency.

FIG. 25 further illustrates a fourth step in the installation method, where the stability brackets 700 are attached to the webs 504 of the runway beams 500 and the columns 100. This configuration maintains precise alignment of the runway beams 500 during operation and seismic events while preserving smooth, rail-free bridge travel.

A fifth step in the installation method comprises grouting. FIG. 26 illustrates completion of this step after the columns 100 have been positioned, aligned, and secured to the concrete slab 116 and after the headers 800 and runway beams 500 have been installed. In this step, grout 118 is poured beneath the base plate 110 of each column 100 to provide uniform bearing between the base plate 110 and the concrete slab 116.

The base plate 110 is configured to function as a pinned connection rather than a fixed connection. By using a relatively thin base plate 110 attached to the column without flaring or gussets therebetween and by relying on the nut-and-washer arrangement for load transfer, the base connection intentionally limits moment transfer into the concrete slab 116. The base connection is configured such that no appreciable moment is transferred to the slab. The plate would bend or deform when a moment is applied to the plate via the column 100. As a result, the concrete slab 116 primarily supports vertical compressive loads and lateral shear forces, while bending moments generated by crane operation and seismic events are resisted by the moment-resisting frame formed by the columns 100, headers 800, torsional corbel assemblies 200, and runway beams 500.

More particularly, the crane system 10 utilizes a pinned base connection at the column interface to the concrete slab 116, which intentionally avoids the transfer of bending moments to the foundation. Despite this pinned behavior and the total absence of diagonal X-bracing, the system maintains its high-tonnage capacity and structural stability by shifting the responsibility for lateral resistance to the upper frame. This is possible because the torsional corbel assembly 200 is engineered as a rigid, closed section that effectively resists twisting by counteracting torque about its central longitudinal axis. Rather than a single column bearing the stress of crane movement or seismic forces in isolation, the structure functions as an interconnected unit. Longitudinal loads are shared across the entire system as the continuity bars 616 structurally link adjacent runway beam sections, allowing forces to be transmitted through the alignment of multiple corbels and columns. This collective load path ensures that the freestanding frame remains stable and plumb without the need for restrictive external bracing.

Figure 29:
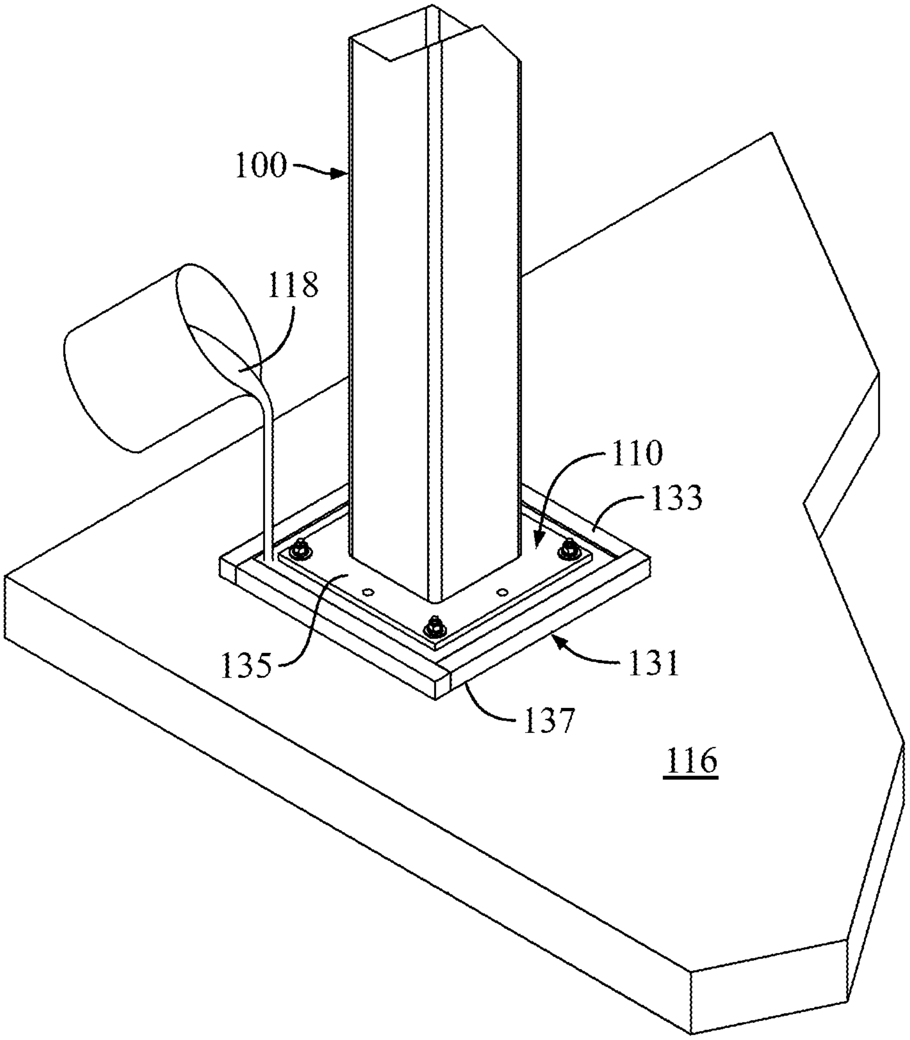
FIG. 29 is an isometric view of form around the column base plate for pouring grout between the concrete slab and the base plate of the column.

FIG. 29 illustrates a form 131 placed around the base plate 110 prior to pouring the grout 118 (see FIG. 26). The form is positioned around the perimeter of the base plate 110 such that the inner walls of the form 131 are approximately 1 inch away from the outer perimeter of the base plate 110. The upper surface 133 of the form 131 is set higher than the upper surface 135 of the base plate 110. A silicone bead may be placed at the intersection 137 between the form and the concrete slab 116 to prevent grout from bleeding out from under the form. The grout 118 is then poured into the form so that it flows beneath the base plate 110 and fills the gap between the base plate 110 and the concrete slab 116.

The grout 118 is preferably a high-strength, non-shrink, flowable, and self-leveling grout, such as SIKAGROUT Product Number 212, which provides uniform bearing and distribution of force to the concrete. Once cured, the grout 118, in cooperation with the post-installed anchors 120, distributes vertical loads from the column 100, the bridge crane, and the carried load evenly into the concrete slab 116 while maintaining the pinned-base behavior established by the nut-and-washer arrangement. The grout 118 does not significantly increase rotational restraint at the base and therefore does not alter the intended load path of the crane system 10.

Together, FIGS. 26-29 illustrate how precise column alignment is locked in place, how the base plates 110 are supported and clamped using post-installed anchors 120, how grout 118 is poured to provide uniform bearing, and how the pinned-base configuration is maintained. This installation approach allows the crane system 10 to achieve an overall height of up to 24 feet and high load capacity while remaining modular, relocatable, and free of building tie-offs. Because the crane system 10 does not require attachment to the building structure and is assembled using standardized bolted components, it can be disassembled and relocated to a different building if needed, remaining the property of the business rather than becoming a permanent building fixture.

A sixth step in the installation method involves placing the bridge 14 onto the runway beams 500 at the job site. Finally, a seventh step consists of mounting the hoist 18 to the bridge 14. Depending on operational requirements, the hoist 18 may be mounted to the bridge 14 at the manufacturing plant (off-site) or at the job site.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A crane system sized to support a lifting capacity between approximately 5 tons and approximately 20 tons, comprising:

a plurality of vertical columns, one or more runway beams supported by the plurality of vertical columns, and at least one torsional corbel assembly fixed to a respective one of the vertical columns and supporting a respective runway beam, wherein the torsional corbel assembly having a corbel body fixed to the respective vertical column, the corbel body being tubular in structure and defining a longitudinal axis that is horizontal and perpendicular to a vertical axis of the respective vertical column, wherein the corbel body includes a distal end portion having a notch formed therein, and a runway beam seat attached to the distal end portion of the corbel body at the notch.

2. The crane system of claim 1, wherein the runway beam seat is tubular in structure and defines a longitudinal axis that is horizontal and perpendicular to the longitudinal axis of the corbel body, the notch defines a plurality of cut edges at the distal end portion of the corbel body, all of the cut edges of the notch are welded to an outer surface of the runway beam seat such that the corbel body and the runway beam seat cooperate to form a closed-section structural assembly, the closed-section structural assembly is configured to resist torsional loads, bending moments, and shear forces transmitted between the runway beam and the respective vertical column, a first gusset is disposed within the tubular corbel body at the distal end portion of the corbel body, a second gusset is disposed within the tubular corbel body at a location offset inward from the distal end portion and positioned at the notched section of the corbel body, a first runway beam seat gusset is disposed within the tubular runway beam seat at a first end portion of the runway beam seat and is oriented transverse to the longitudinal axis of the runway beam seat, and a second runway beam seat gusset is disposed within the tubular runway beam seat at an opposed end portion of the runway beam seat and is oriented parallel to the longitudinal axis of the runway beam seat.

3. The crane system of claim 1, wherein the torsional corbel assembly forms part of a moment-resisting frame of the crane system in at least one horizontal direction.

4. The crane system of claim 1, further comprising left and right-side plates welded to the tubular corbel body, and the left and right-side plates are welded to corresponding left and right-side surfaces of the respective vertical column.

5. The crane system of claim 4, wherein the left and right-side plates cooperate with the tubular corbel body to transmit torsional, bending, and shear loads between the runway beam seat and the respective vertical column.

6. The crane system of claim 1, wherein the runway beam seat includes an upper surface that is flat to within 1/32 inch.

7. The crane system of claim 1, wherein the runway beam seat includes one or more transverse slotted holes configured to receive fasteners for bolted attachment of the runway beam to the runway beam seat, and the transverse slotted holes permit adjustment of the runway beam relative to the runway beam seat to straighten connected runway beams.

8. The crane system of claim 1, wherein the tubular corbel body and the tubular runway beam seat are delivered to a job cite as a preassembled unit.

9. The crane system of claim 1, wherein the torsional corbel assembly remains substantially rigid while a portion of the respective vertical column below the torsional corbel assembly flexes during seismic loading.

10. The crane system of claim 9, wherein substantially rigid means that deformation of the closed-section structural assembly is less than deformation of the vertical column below the torsional corbel assembly under the same loading condition.

11. The crane system of claim 1, wherein the runway beam seat is configured to support square-cut end portions of adjacent runway beam segments in end-to-end alignment.

12. The crane system of claim 1, wherein the runway beam seat includes internal gussets that maintain flatness of an upper surface of the runway beam seat under load.

* * * * *